US012756574B2

(12) United States Patent
Naik

(10) Patent No.: US 12,756,574 B2
(45) Date of Patent: Oct. 6, 2026

(54) MESSAGE SCHEDULING FOR CRYPTOGRAPHIC HASHING

(71) Applicant: QUANTUM BLOCKCHAIN TECHNOLOGIES PLC, London (GB)

(72) Inventor: Rahul Naik, London (GB)

(73) Assignee: Quantum Blockchain Technologies PLC, London (GB)

( * ) Notice: Subject to any disclaimer, the term of this patent is extended or adjusted under 35 U.S.C. 154(b) by 109 days.

(21) Appl. No.: 18/696,073

(22) PCT Filed: Sep. 28, 2022

(86) PCT No.: PCT/GB2022/052458
§ 371 (c)(1),
(2) Date: Mar. 27, 2024

(87) PCT Pub. No.: WO2023/052762
PCT Pub. Date: Apr. 6, 2023

(65) Prior Publication Data

US 2024/0405998 A1 Dec. 5, 2024

(30) Foreign Application Priority Data

Sep. 29, 2021 (GB) ..................................... 2113962

(51) Int. Cl.
*H04L 9/32* (2006.01)

(52) U.S. Cl.
CPC .................................. *H04L 9/3239* (2013.01)

(58) Field of Classification Search
CPC .... H04L 9/3239; H04L 2209/125; H04L 9/50
See application file for complete search history.

(56) References Cited

U.S. PATENT DOCUMENTS 7,151,829 B2 * 12/2006 Condorelli ............ H04L 9/0643 713/180
2004/0139336 A1 * 7/2004 McLean .................... H04L 9/12 713/189

(Continued)

FOREIGN PATENT DOCUMENTS

WO 2015077378 5/2015

OTHER PUBLICATIONS

N. T. Courtious et al. Optimizing SHA256 in Bitcoin Mining. CSS, CCIS 448, pp. 131-144. Springer-Verlag, Berlin, Heidelberg (Year: 2014).*

(Continued)

*Primary Examiner* — Lynn D Feild
*Assistant Examiner* — Vladimir I Gavrilenko
(74) *Attorney, Agent, or Firm* — Andrus Intellectual Property Law, LLP

(57) ABSTRACT

A method of performing cryptographic hashing when mining for Bitcoin comprises causing a message scheduler to calculate a set of partially-calculated input values for a SHA256 (e.g. $SHA256_0$ 424) cryptographic compression function using values which are based on invariable portions taken from an initial input message of the input messages (e.g. 418) to be hashed. For each subsequent input message of the input messages (e.g. 418) to be hashed, a set of fully-calculated input values for the SHA256 (e.g. $SHA256_0$ 424) cryptographic compression function is calculated using the partially-calculated input values and values which are based on variable portions of the subsequent input message to be hashed. The set of fully-calculated input values is then provided for use when performing the SHA256 (e.g. $SHA256_0$ 424) cryptographic compression function in respect of the subsequent input message. This reduces the (Continued)

number of calculations which need to be performed by the message scheduler.

18 Claims, 10 Drawing Sheets

(56) References Cited

U.S. PATENT DOCUMENTS

| | | | | |
|---|---|---|---|---|
| 2007/0055873 | A1* | 3/2007 | Leone | H04L 63/0853 713/168 |
| 2009/0262925 | A1* | 10/2009 | Vijayarangan | H04L 9/0643 380/29 |
| 2017/0034167 | A1* | 2/2017 | Figueira | H04L 63/061 |
| 2021/0185066 | A1* | 6/2021 | Shah | G06N 3/08 |

OTHER PUBLICATIONS

R. P. Naik. Optimising the SHA256 Hashing Algorithm for Faster and More Efficient Bitcoin Mining. MS thesis. Information Security at University College London (Year: 2013).*

N. T. Courtious et al. Optimizing SHA256 in Bitcoin Mining. CSS 2014, CCIS 448, pp. 131-144. Springer-Verlag, Berlin, Heidelberg, (Year: 2014).*

P. Naik. Optimizing the SHA256 Hashing Algorithm for Faster and More Efficient Bitcoin Mining. MS thesis. Information Security at University College London (Year: 2013).*

Nicolas T. Courtois et al. "Optimizing SHA256 in Bitcoin Mining." In: Kotulski, Z., Księżopolski, B., Mazur, K. (eds) Cryptography and Security Systems. CSS 2014. Communications in Computer and Information Science, vol. 448. Springer, Berlin, Heidelberg.

Rahul P. Naik, "Optimising the SHA256 Hashing Algorithm for Faster and More Efficient Bitcoin Mining", Sep. 2, 2013, University College London.

Dr. Timo Hanke, "AsicBoost—A Speedup for Bitcoin Mining", Mar. 31, 2016, Rev. 5.

PCT/GB2022/052458, International Search Report and Written Opinion dated Jan. 9, 2023, 7 pages.

* cited by examiner

MESSAGE SCHEDULING FOR CRYPTOGRAPHIC HASHING

CROSS-REFERENCE TO RELATED APPLICATIONS

This application is the U.S. national stage application of International Application No. PCT/GB2022/052458, filed Sep. 28, 2022, which international application was published on Apr. 6, 2023, as WO 2023/052762 A1 in the English language. The International Application claims priority to Great Britain Patent Application No. 2113962.1, filed Sep. 29, 2021. The international application and Great Britain application are incorporated herein by reference, in their entireties.

FIELD

The present invention relates to the operation of a message scheduler when performing cryptographic hashing in respect of plural different input messages to be hashed. The present invention relates particularly, although not exclusively, to cryptographic hashing when mining for crypto-currency, such as Bitcoin.

BACKGROUND

Bitcoin mining comprises applying three instances of a SHA256 cryptographic hashing function (referred to herein respectively as "$SHA256_0$." "$SHA256_1$" and "$SHA256_2$") to an input message, which is derived from a Bitcoin Block Header. $SHA256_0$ uses a standard initialisation vector IV and is applied to a first part of the Bitcoin Block Header. $SHA256_1$ then uses the message digest $H_0$ of $SHA256_0$ as an initialisation vector and is applied to a second part of the Bitcoin Block Header plus some padding. Finally, $SHA256_2$ again uses the standard initialisation vector IV and is applied to the message digest of $SHA256_1$ plus some padding.

The ultimate aim of Bitcoin mining is to find a $SHA256_2$ message digest or "hash" that is lower than or equal to the current Target. If the Target condition is met, then the Bitcoin Block Header in question is accepted by the Bitcoin Network and the Bitcoin miner receives a mining award. On the other hand, if the Target condition is not met, the Bitcoin miner will need to perform cryptographic hashing in respect of one or more different Bitcoin Block Headers until the specified Target condition is met.

The different Bitcoin Block Headers are generally generated by incrementing a Nonce field in the second part of the Bitcoin Block Header. In this case, since the first part of the Bitcoin Block Header remains unchanged, the output of $SHA256_0$ is unchanged and there is no need to re-perform $SHA256_0$ for each new Nonce. Once all values for the Nonce have been exhausted, then a Bitcoin Block Header that references different transactions, by way of a different HashMerkleRoot, might be considered. Since the HashMerkleRoot spans both parts of the Bitcoin Block Header, $SHA256_0$ then needs to be re-performed to generate a new message digest $H_0$, and $SHA256_1$ then needs to be re-applied to the second part of the Bitcoin Block Header using that new message digest $H_0$ as the initialisation vector.

Bitcoin mining can be extremely computationally expensive and various optimisations have therefore been proposed. For example, Rahul P. Naik, "Optimising the SHA256 Hashing Algorithm for Faster and More Efficient Bitcoin Mining", MSc Information Security Department of Computer Science UCL, 2013, describes various optimisations which make use of the fact that certain portions of the Bitcoin Block Header remain unchanged, or are slow to change, or are merely incremented, for plural different input messages. US 2018/0006808 A1 describes further optimisations which use hardwired values for the portions of input messages that always remain the same.

The above optimisations go some way to reducing the computational burden but further optimisation, particularly relating to message scheduling, is possible. In this regard, when performing the cryptographic hashing, a message scheduler is used to calculate (from distinct portions of the input message) a set of input values for compression by the cryptographic compression function. This process of calculating the input values can contribute significantly to the computational effort required to perform the cryptographic hashing.

EP 3 095 044 A1 accordingly describes an optimisation commonly known as "ASICBoost" in which different input messages are used for $SHA256_0$ but in which the last 32 bits of the HashMerkleRoot in the Bitcoin Block Header, which are used to derive the input message for $SHA256_1$, are kept the same. This is achieved either by identifying multiple instances of HashMerkleRoot that collide in the last 32 bits (commonly known as "Covert ASICBoost") or by incrementing the Version in the Bitcoin Block Header (commonly known as "Overt ASICBoost"). The same message schedule for $SHA256_1$ can then be reused for multiple outputs of $SHA256_0$. Pham et al, "*Double SHA-*256 *Hardware Architecture With Compact Message Expander for Bitcoin Mining*". IEEE Access, Volume 8, 2020, pp. 139634-139646, also describes avoiding certain message scheduler calculations for $SHA256_1$ and $SHA256_2$ where the input values will always have the value 0x00000000.

It is desired to provide further improvements relating to message scheduling for cryptographic hashing.

SUMMARY

According to an aspect of the present invention there is provided a method of performing cryptographic hashing in respect of plural different input messages to be hashed, the method comprising:

causing a message scheduler to:

calculate a set of one or more partially-calculated input values for a cryptographic compression function using one or more values based on one or more invariable portions of an initial input message to be hashed, wherein corresponding ones of the invariable portions do not vary across the plural different input messages to be hashed; and for each of one or more subsequent input messages to be hashed:

calculate a set of fully-calculated input values for the cryptographic compression function, wherein calculating the set of fully-calculated input values comprises performing calculations using one or more of the partially-calculated input values and one or more values based on one or more variable portions of the subsequent input message to be hashed, wherein corresponding ones of the variable portions do vary across the plural different input messages to be hashed; and provide the set of fully-calculated input values for use when performing the cryptographic compression function in respect of the subsequent input message.

According to another aspect of the present invention there is provided an apparatus for performing cryptographic hashing in respect of plural different input messages to be hashed, the apparatus comprising:

a message scheduler having processing circuitry configured to:

calculate a set of one or more partially-calculated input values for a cryptographic compression function using one or more values based on one or more invariable portions of an initial input message to be hashed, wherein corresponding ones of the invariable portions do not vary across the plural different input messages to be hashed; and for each of one or more subsequent input messages to be hashed:

calculate a set of fully-calculated input values for the cryptographic compression function, wherein calculating the set of fully-calculated input values comprises performing calculations using one or more of the partially-calculated input values and one or more values based on one or more variable portions of the subsequent input message to be hashed, wherein corresponding ones of the variable portions do vary across the plural different input messages to be hashed; and provide the set of fully-calculated input values for use when performing the cryptographic compression function in respect of the subsequent input message.

As will be appreciated, the present invention can greatly increase speed and efficiency when performing cryptographic hashing in respect of plural different input messages which have invariable portions and variable portions. In particular, the Applicant has recognised that certain input values for a cryptographic compression function may vary for plural different input messages to be hashed. This is because those variable input values are derived from message portions which vary across the plural different input messages to be hashed. However, the Applicant has identified that even those variable input values might be calculated at least in part using message portions which do not vary across the plural different input messages to be hashed. The Applicant has then recognised that those variable input values can at least be partially calculated once in respect of an initial input message using the invariable portions, and that those partially-calculated input values can then be reused to calculate fully-calculated input values for one or more subsequent input messages. This can significantly reduce the number of calculations which need to be performed when calculating the variable input values for plural different input messages to be hashed. This in turn can significantly increase the processing speed and/or can significantly reduce the processing burden placed on the apparatus used to perform the cryptographic hashing. This is in contrast to the known optimisations in which only invariable fully-calculated input values are determined in advance and then reused for plural different input messages.

In embodiments, the cryptographic hashing may be performed when mining for cryptocurrency, such as (but not limited to) Bitcoin. However, the techniques disclosed herein may equally be applied in other cryptographic hashing contexts in which plural input messages have invariable portions and variable portions.

In embodiments, the cryptographic compression function may be a SHA256 compression function. The cryptographic compression function may be a first instance cryptographic compression function (referred to herein as "$SHA256_0$"), a second instance cryptographic compression function (referred to herein as "$SHA256_1$"), or a third instance cryptographic compression function (referred to herein as "$SHA256_2$"). Overall, the cryptographic hashing may comprise performing plural (e.g. three) instances of a cryptographic compression function, with a message scheduler for one or more (e.g. each) instance operating in the manner of the present invention.

In embodiments, the plural different input messages to be hashed may each correspond to a different Bitcoin Block Header. The Bitcoin Block Headers may each comprise a Version field, a HashPrevBlock field, a HashMerkleRoot field, a Timestamp field, a Target field, and a Nonce field. The Bitcoin Block Headers may be padded with a Padding+Length field for the purposes of the cryptographic hashing. The one or more invariable portions and/or one or more variable portions may be distinct portions of an input message to be hashed.

In embodiments in which the cryptographic compression function is a first instance cryptographic compression function ($SHA256_0$), the plural different input messages to be hashed may each comprise a Version field, a HashPrevBlock field, and/or a (first) part of a HashMerkleRoot field. The one or more invariable portions may correspond to the HashPrevBlock field and/or to the (first) part of the HashMerkleRoot field. The one or more variable portions may correspond to the Version field. The Version field may be incremented across the plural different input messages. In embodiments in which the cryptographic compression function is a first instance cryptographic compression function ($SHA256_0$), the cryptographic compression function may use the SHA256 standard initialisation vector as the initialisation vector.

In embodiments in which the cryptographic compression function is a second instance cryptographic compression function ($SHA256_1$), the plural different input messages to be hashed may each comprise a (second) part of a HashMerkleRoot field, a Timestamp field, a Target field, a Nonce field, and/or a Padding+Length field. The one or more invariable portions may correspond to the (second) part of the HashMerkleRoot field, the Timestamp field, the Target field, and/or the Padding+Length field. The one or more variable portions may correspond to the Nonce field. The Nonce field may be incremented across the plural different input messages. In embodiments in which the cryptographic compression function is a second instance cryptographic compression function ($SHA256_1$), the cryptographic compression function may use a message digest (from a first instance cryptographic compression function ($SHA256_0$)) as the initialisation vector.

In embodiments in which the cryptographic compression function is a third instance cryptographic compression function ($SHA256_2$), the plural different input messages to be hashed may each comprise a Message Digest field (from a second instance cryptographic compression function ($SHA256_1$)) and a Padding+Length field. The one or more invariable portions may correspond to the Padding+Length field. The one or more variable portions may correspond to the Message Digest field. In embodiments in which the cryptographic compression function is a third instance cryptographic compression function ($SHA256_2$), the cryptographic compression function may use the SHA256 standard initialisation vector as the initialisation vector.

It will be appreciated that the one or more invariable portions referred to herein will not vary across the plural different input messages to be hashed, i.e. those message portions will be the same in each and every one of the plural different input messages. Moreover, it may be the case that one or more of those invariable portions will always be the same for the cryptographic hashing context (e.g. independent of any Bitcoin Block Header), such as the Padding+

Length field. However, it will also be appreciated that one or more of the invariable portions may change for input messages not forming part of the plural different input messages to be processed in the manner of the present invention. For example, one or more of the invariable portions may change if there is an update to the HashPrevBlock field, HashMerkleRoot field, Timestamp field, and/or Target field. In this case, the one or more partially-calculated input values may need to be re-calculated based on a further initial input message for a further set of plural different input messages so as to again be processed in the manner of the present invention.

It will also be appreciated that the one or more variable portions referred to herein will vary across the plural different input messages to be hashed, i.e. those message portions will be different in each and every one of the plural different input messages. For example, as discussed above, those one or more variable portions may be incremented across the plural different input messages.

In embodiments, for the initial input message, the calculation of a partially-calculated input value of the set of one or more partially-calculated input values may comprise performing some, but not all, of the operations in a (e.g. SHA256) message scheduling calculation. The message scheduling calculation may comprise performing:

$$\sigma_1(W[t-2]) + W[t-7] + \sigma_0(W[t-15]) + W[t-16]$$

where:

$$\sigma_1(x) = ROTR_{17}(x) \oplus ROTR_{19}(x) \oplus SHR_{10}(x)$$

$$\sigma_0(x) = ROTR_7(x) \oplus ROTR_{18}(x) \oplus SHR_3(x)$$

$ROTR_i$ is a bitwise rotate right for i bits $SHR_i$ is a bitwise shift right for i bits; and $\oplus$ is a bitwise exclusive OR Thus, for the initial input message, the calculation of a partially-calculated input value of the set of one or more partially-calculated input values may comprise performing one or more of: an add operation; a bitwise rotate right (ROTR) operation; a bitwise shift right (SHR) operation; and a bitwise exclusive OR ($\oplus$) operation.

In embodiments, the message scheduler may be configured to store one or more partially-calculated input values (e.g. in electronic storage such as (but not limited to) registers and/or memory). The message scheduler may be configured to retrieve one or more partially-calculated input values (e.g. from the electronic storage) prior to performing calculations using one or more of the partially-calculated input values.

In embodiments, for a subsequent input message to be hashed, the calculation of a fully-calculated input value of the set of fully-calculated input values may comprise performing some, but not all, of the operations (e.g. performing the remaining operations) in a (e.g. SHA256) message scheduling calculation. Again, the message scheduling calculation may comprise performing:

$$\sigma_1(W[t-2]) + W[t-7] + \sigma_0(W[t-15]) + W[t-16]$$

where:

$$\sigma_1(x) = ROTR_{17}(x) \oplus ROTR_{19}(x) \oplus SHR_{10}(x)$$

$$\sigma_0(x) = ROTR_7(x) \oplus ROTR_{18}(x) \oplus SHR_3(x)$$

$ROTR_i$ is a bitwise rotate right for i bits $SHR_i$ is a bitwise shift right for i bits; and $\oplus$ is a bitwise exclusive OR Thus, for a subsequent input message to be hashed, the calculation of a fully-calculated input value of the set of fully-calculated input values may comprise performing one or more of: an add operation; a bitwise rotate right (ROTR) operation; a bitwise shift right (SHR) operation; and a bitwise exclusive OR ($\oplus$) operation.

In embodiments, for each subsequent input message to be hashed, the calculation of a fully-calculated input value may also comprise adding a round-specific constant to the fully-calculated input value. Adding a round-specific constant may be performed by the message scheduler. Alternatively, adding a round-specific constant may be performed by a message compressor that performs the cryptographic compression function in respect of the subsequent input message.

In embodiments, the message scheduler may be further configured to derive a set of one or more incrementable fully-calculated input values for the cryptographic compression function based on one or more incremented portions of the initial input message to be hashed, wherein the one or more incremented portions will be incremented across the plural different input messages to be hashed. The message scheduler may be further configured to store one or more of the incrementable fully-calculated input values (e.g. in electronic storage such as (but not limited to) registers and/or memory). The message scheduler may be further configured to retrieve the one or more incrementable fully-calculated input values (e.g. from the electronic storage). For each of the one or more subsequent input messages, the process of calculating the set of fully-calculated input values may comprise calculating a set of one or more incremented fully-calculated input values for the cryptographic compression function by incrementing the one or more incrementable fully-calculated input values. The set of one or more incremented fully-calculated input values may then be provided for use when performing the cryptographic compression function in respect of the subsequent input message. The set of one or more incremented fully-calculated input values may also be used as the set of one or more incrementable fully-calculated input values for the next subsequent input message.

In embodiments in which the cryptographic compression function is a first instance cryptographic compression function ($SHA256_0$), the one or more incremented portions may correspond to the Version field. In embodiments in which the cryptographic compression function is a second instance cryptographic compression function ($SHA256_1$), the one or more incremented portions may correspond to the Nonce field.

In embodiments, the message scheduler may be further configured to derive a set of one or more invariable fully-calculated input values for the cryptographic compression function based (e.g. solely) on one or more invariable portions of the initial input message to be hashed, wherein corresponding ones of the invariable portions do not vary across the plural different input messages to be hashed. The message scheduler may be further configured to store one or more of the invariable fully-calculated input values (e.g. in electronic storage such as (but not limited to) registers and/or memory). The message scheduler may be further configured to retrieve the one or more invariable fully-calculated input values (e.g. from the electronic storage). One or more of the invariable fully-calculated input values may, for example, be stored in non-volatile memory. One or more of the invariable fully-calculated input values may also or instead be hardwired, for example in cases where those invariable fully-calculated input values will always be the same for the cryptographic hashing context (e.g. independent of any Bitcoin Block Header). The set of one or more invariable fully-calculated input values may then be provided for use when performing the cryptographic compression function in respect of the subsequent input message.

The Applicants have further identified that, due to the calculation of input values based on an initial input message, certain calculations which are needed when performing full calculation of input values in respect of a subsequent input message can be performed in parallel. This is because some calculations required when calculating the one or more fully-calculated input values for the subsequent input message will already have been performed when calculating the input values for the initial input message. This can allow for parallel calculation of the fully-calculated input values for the subsequent input message.

Thus, in embodiments, calculating the set of one or more fully-calculated input values for a subsequent input message may comprise calculating a first set of fully-calculated input values for the subsequent input message and calculating a second set of fully-calculated input values for the subsequent input message, wherein calculation of the first set of fully-calculated input values is performed in parallel with calculation of the second set of fully-calculated input values. In embodiments, one or more of the first set of fully-calculated input values may be used when calculating one or more of the second set of fully-calculated values and one or more of the second set of fully-calculated input values may be used when calculating one or more of the first set of fully-calculated values. These embodiments can significantly increase the processing speed by introducing parallelism to the message scheduler.

As will be appreciated, where there are variable fully-calculated input values which cannot make use of one or more invariable portions in the manner described herein, calculating the set of fully-calculated input values for a subsequent input message may further comprise fully calculating those variable fully-calculated input values using the full message scheduling calculation.

As will also be appreciated, embodiments may further comprise, for each of one or more subsequent input messages, causing a message compressor to perform the cryptographic compression function in respect of the subsequent input message using the set of fully-calculated input values to generate a message digest. The message digest from one instance may be passed to a subsequent instance (in the case of $SHA256_0$ and $SHA256_1$) or may be compared to the Target (in the case of $SHA256_2$).

Embodiments can be implemented in any desired and suitable data processing apparatus, such as any suitably configured computer-based, processor-based, and/or circuitry-based, system. Similarly, the various functions of the apparatus described herein can be carried out in any desired and suitable manner. For example, the functions of the apparatus described herein may be implemented in hardware and/or software as desired. Thus, unless otherwise indicated, the various functional elements described herein may, for example, comprise a suitable processor or processors, controller or controllers, functional unit or units, circuitry, processing logic, microprocessor arrangements, etc., that are operable to perform the various functions, etc., such as appropriately dedicated hardware elements (processing circuitry) and/or programmable hardware elements (processing circuitry) that are configured to operate in the desired manner. In embodiments, the apparatus may comprise one or more integrated circuits, such as one or more ASICs (Application-Specific Integrated Circuits) and/or FPGAs (Field-Programmable Gate Arrays). In embodiments, the apparatus may comprise, and/or may be in communication with, one or more electronic storage devices that store the data (e.g. input message data, partially-calculated input values, fully-calculated input values, round-specific constants, initialisation vectors, message digests, etc.) as described herein.

BRIEF DESCRIPTION OF DRAWINGS

By way of example only, embodiments of the present invention will now be described in detail with reference being made to the accompanying drawings in which.

DETAILED DESCRIPTION

Figure 1:
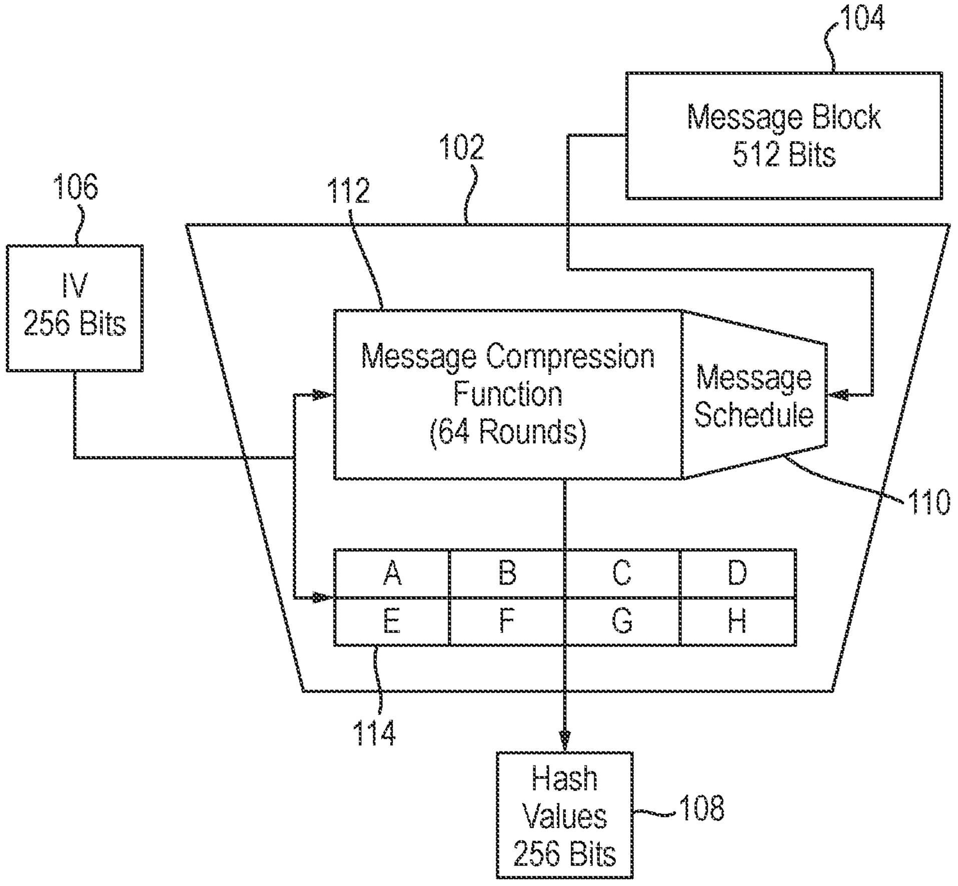
FIG. 1 illustrates a cryptographic hashing module according to an embodiment of the present invention.

FIG. 1 shows a cryptographic hashing module 102 comprising processing circuitry for performing cryptographic hashing. The cryptographic hashing module 102 may, for example, be implemented using one or more ASICs. In this embodiment, the cryptographic hashing module 102 performs SHA256 to compress a 512-bit input message 104 based on a 256-bit initialisation vector 106 in order to produce a 256-bit message digest or hash 108. The cryptographic hashing module 102 comprises a message scheduler 110 which divides the input message 104 into distinct portions and uses those distinct portions to derive a set of input values for t rounds of message compression performed by message compressor 112.

In SHA256, the message scheduler 110 divides the input message 104 into 16×32-bit words M[0]-M[15] and expands those 16×32-bit words to derive a set of 64×32-bit input values W[0]-W[63] for the message compressor 112 in accordance with the following:

$$\text{For } 0 \le t \le 15,$$

$$W[t] = M[t]$$

$$\text{For } 16 \le t \le 63,$$

$$W[1] = \sigma_1(W[t-2]) + W[t-7] + \sigma_0(W[t-15]) + W[t-16]$$

$$\text{where:}$$

$$\sigma_1(x) = ROTR_{17}(x) \oplus ROTR_{19}(x) \oplus SHR_{10}(x)$$

$$\sigma_0(x) = ROTR_7(x) \oplus ROTR_{18}(x) \oplus SHR_3(x)$$

$ROTR_i$ is a bitwise rotate right for i bits $SHR_i$ is a bitwise shift right for i bits; and $\oplus$ is a bitwise exclusive OR The 8 elements $H_A$-$H_H$ of the initialisation vector 106 are stored as working variables A-H in electronic storage 114 as follows:

$A=H_A$; $B=H_B$; $C=H_C$; $D=H_D$; $E=H_E$; $F=H_F$; $G=H_G$; $H=H_H$

The message compressor 112 then performs 64 rounds of a SHA256 message compression function using the set of input values W[0]-W[63] provided by the message scheduler 110, together with the working variables A-H stored in electronic storage 114 and a set of 64×32-bit round-specific constants K[0]-K[63] in accordance with the following:

$$T_1 = H + \sum\nolimits_1(E) + Ch(E, F, G) + K[t] + W[t]$$

$$T_2 = \sum\nolimits_0(A) + Maj(A, B, C)$$

$$H = G; G = F; F = E$$

$$E = D + T_1 = D + H + \sum\nolimits_1(E) + Ch(E, F, G) + K[t] + W[t]$$

$$D = C; C = B; B = A$$

$$A = T_1 + T_2 = H + \sum\nolimits_1(E) + Ch(E, F, G) + \sum\nolimits_0(A) + Maj(A, B, C) + K[t] + W[t]$$

-continued where, $$Ch(E, F, G) = (E \wedge F) \oplus (\neg E \wedge G)$$

$$Maj(A, B, C) = (A \wedge B) \oplus (A \wedge C) \oplus (B \wedge C)$$

$$\sum\nolimits_0(A) = ROTR_2(A) \oplus ROTR_{13}(A) \oplus ROTR_{22}(A)$$

$$\sum\nolimits_1(E) = ROTR_6(E) \oplus ROTR_{11}(E) \oplus ROTR_{25}(E)$$

After the 64 rounds the following calculations are performed:

$$H_A = A + H_A$$

$$H_B = B + H_B$$

$$H_C = C + H_C$$

$$H_D = D + H_D$$

$$H_E = E + H_E$$

$$H_F = F + H_F$$

$$H_G = G + H_G$$

$$H_H = H + H_H$$

With the final message digest (big-endian) being given by:

$$H = H_A \| H_B \| H_C \| H_D \| H_E \| H_F \| H_G \| H_H$$

In SHA256, the standard initialisation vector IV is:

$$H_A = 0 \times 6a09e667$$

$$H_B = 0 \times bb67ae85$$

$$H_C = 0 \times 3c6ef372$$

$$H_D = 0 \times a54ff53a$$

$$H_E = 0 \times 510e527f$$

$$H_F = 0 \times 9b05688c$$

$$H_G = 0 \times lf83d9ab$$

$$H_H = 0 \times 5be0cdl9$$

and the round-specific constants K[0]-K[63] are:

| | | | |
|---|---|---|---|
| K[0] = 0x428A2F98 | K[1] = 0x71374491 | K[2] = 0xB5COFBCF | K[3] = 0xE9B5DBA5 |
| K[4] = 0x3956C25B | K[5] = 0x59F111F1 | K[6] = 0x923F82A4 | K[7] = 0xAB1C5ED5 |
| K[8] = 0xD807AA98 | K[9] = 0x12835B01 | K[10] = 0x243185BE | K[11] = 0x550C7DC3 |
| K[12] = 0x72BE5D74 | K[13] = 0x80DEB1FE | K[14] = 0x9BDC06A7 | K[15] = 0xC19BF174 |
| K[16] = 0xE49B69C1 | K[17] = 0xEFBE4786 | K[18] = 0x0FC19DC6 | K[19] = 0x240CA1CC |
| K[20] = 0x2DE92C6F | K[21] = 0x4A7484AA | K[22] = 0x5CB0A9DC | K[23] = 0x76F988DA |
| K[24] = 0x983E5152 | K[25] = 0xA831C66D | K[26] = 0xB00327C8 | K[27] = 0xBF597FC7 |
| K[28] = 0xC6E00BF3 | K[29] = 0xD5A79147 | K[30] = 0x06CA6351 | K[31] = 0x14292967 |
| K[32] = 0x27B70A85 | K[33] = 0x2E1B2138 | K[34] = 0x4D2C6DFC | K[35] = 0x53380D13 |
| K[36] = 0x650A7354 | K[37] = 0x766A0ABB | K[38] = 0x81C2C92E | K[39] = 0x92722C85 |
| K[40] = 0xA2BFE8A1 | K[41] = 0xA81A664B | K[42] = 0xC24B8B70 | K[43] = 0xC76C51A3 |
| K[44] = 0xD192E819 | K[45] = 0xD6990624 | K[46] = 0xF40E3585 | K[47] = 0x106AA070 |
| K[48] = 0x19A4C116 | K[49] = 0x1E376C08 | K[50] = 0x2748774C | K[51] = 0x34B0BCB5 |
| K[52] = 0x391C0CB3 | K[53] = 0x4ED8AA4A | K[54] = 0x5B9CCA4F | K[55] = 0x682E6FF3 |
| K[56] = 0x748F82EE | K[57] = 0x78A5636F | K[58] = 0x84C87814 | K[59] = 0x8CC70208 |
| K[60] = 0x90BEFFFA | K[61] = 0xA4506CEB | K[62] = 0xBEF9A3F7 | K[63] = 0xC67178F2 |

Figure 2:
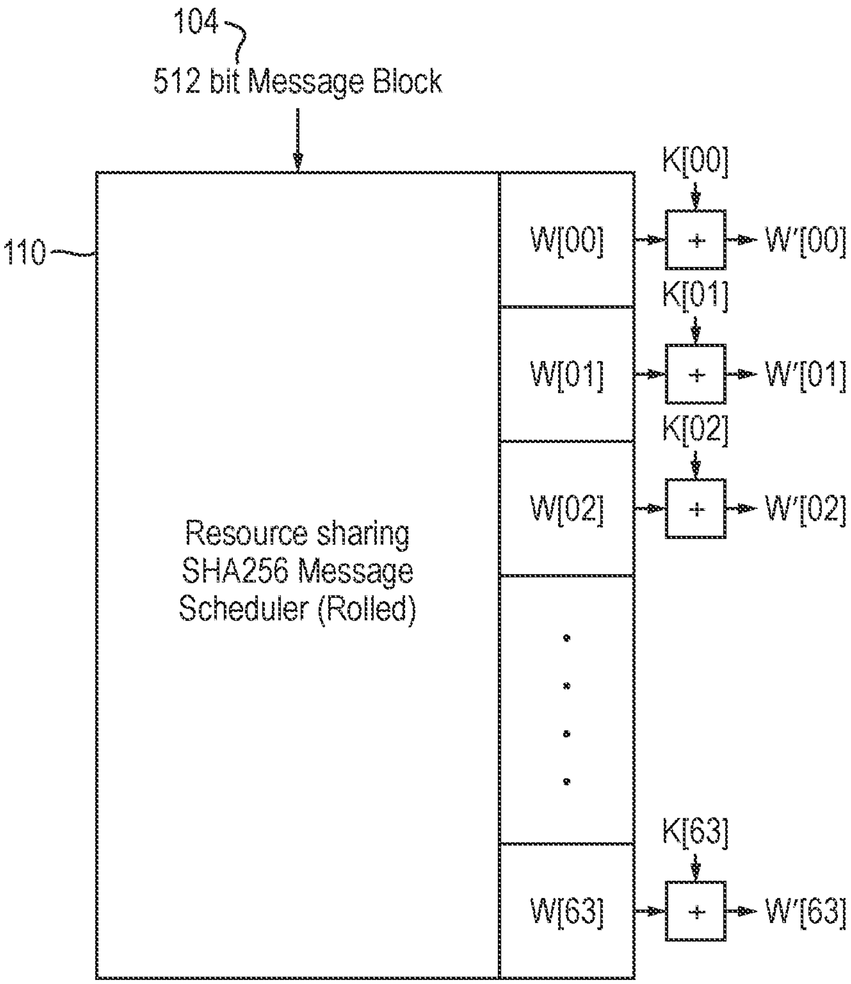
FIG. 2 shows details of a message scheduler for use in the cryptographic hashing module of FIG. 1.

FIG. 2 shows further details of the message scheduler 110. In this embodiment, the message scheduler 110 comprises a resource sharing (rolled) hardware architecture. The message scheduler 110 receives the input message 104 and calculates a set of input values W[0]-W[63] for the compression function as discussed above. In this embodiment, the message scheduler 110 also performs the step of adding the set of round-specific constants K[0]-K[63] respectively to the set of input values W[0]-W[63] to generate a set of constant-modified input values W'[0]-W'[63], although in other embodiments this addition could instead be performed by the message compressor 112.

Figure 3:
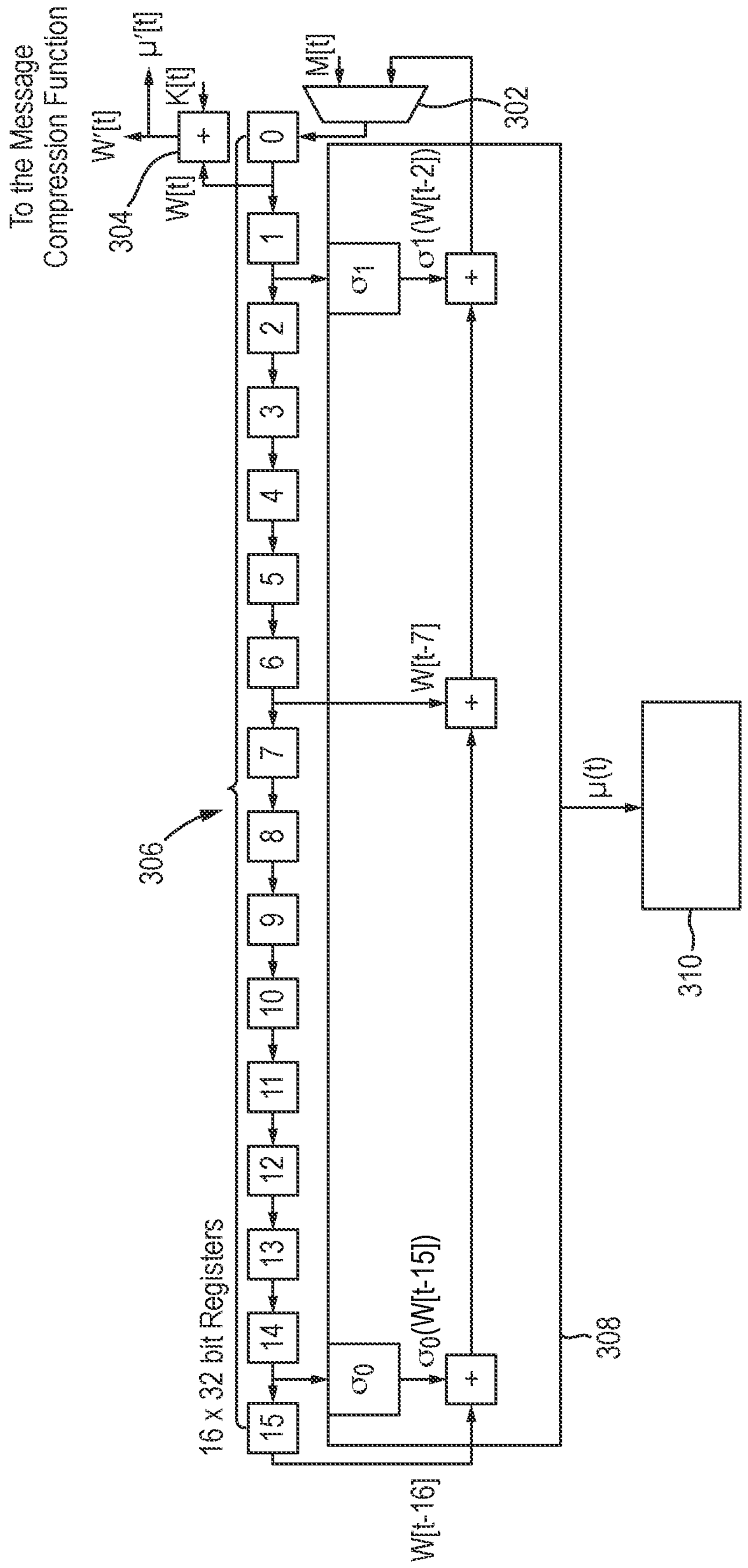
FIG. 3 shows details of a section of the message scheduler of FIG. 2.

FIG. 3 shows details of a section of the message scheduler 110. In this embodiment, the section of the message scheduler 110 comprises a multiplexor 302 for progressively selecting, in respect of an initial input message, the input value W[t] either to be i) M[t] for 0≤t≤15; or ii) $\sigma_1$(W[t−2])+W[t−7]+$\sigma_0$(W[t−15])+W[t−16] for 16≤t≤63. The selected input value W[t] is then progressively passed to circuitry 304 for addition with K[t] to produce the constant-modified input value W'[t], which as discussed below may in some cases be stored as a reusable value μ'[t]. To enable the calculation of W[t] for 16≤t≤63, the input values W[t] are also progressively moved through a set of 16×32-bit registers 306. Circuitry 308 is then used to perform the standard message scheduling calculation: $\sigma_1$(W[t−2])+W[t−7]+$\sigma_0$(W[t−15])+W[t−16]. In accordance with embodiments of the present invention, the circuitry 308 can also perform only selected ones of the operations in the message scheduling calculation to produce reusable values μ[t]. Those reusable values μ[t] can then be stored in electronic storage 310 for later use with subsequent input messages. Using a resource sharing (rolled) hardware architecture for the one-off computations in respect of an initial input message reduces the need for a large chip area and reduces power consumption. The section of the message scheduler 110 as shown in FIG. 3 can then be shut down to conserve energy when calculating input values for subsequent input messages.

Figure 4:
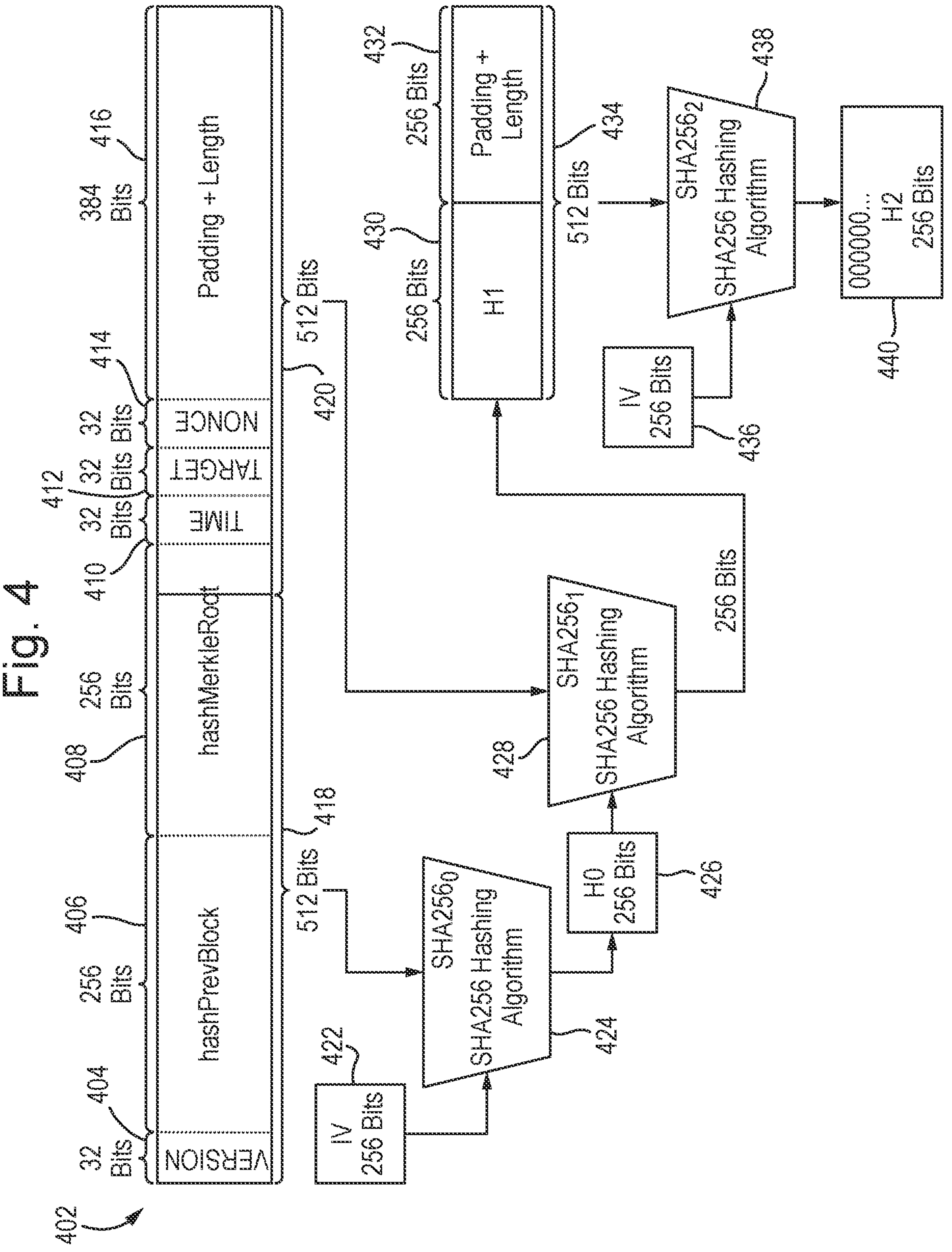
FIG. 4 illustrates cryptographic hashing of a Bitcoin Block Header according to an embodiment of the present invention.

FIG. 4 shows cryptographic hashing of a Bitcoin Block Header 402. The Bitcoin Block Header 402 contains: a 32-bit Version field 404 which provides block version information; a 256-bit HashPrevBlock field 406 which provides the message digest of the previous block accepted by the Bitcoin Network which is referenced by the current block; a 256-bit HashMerkleRoot field 408 which provides a message digest of the Merkle Root for the unconfirmed transactions that are selected by the Bitcoin miners to include in the new block; a 32-Bit Timestamp field 410 which provides the current timestamp in seconds since 1970-01-01 00:00 UTC; a 32-bit Target field 412 which provides the current Target to be met for the message digest of the new block (i.e. indicative of a particular minimum number of leading zeros that the message digest must have); and a 32-bit Nonce field 414 which is used to add variation to the block header so as to compute different message digests. A 384-bit Padding+Length field 416 is appended to provide two 512-bit input messages 418 and 420 of suitable size for cryptographic hashing using SHA256. In some embodiments, the Padding+Length may be provided by non-volatile memory or hardwired values since the values in question are always constant.

In order to perform the cryptographic hashing, a first input message 418 is provided to a first cryptographic hashing module 424. The first cryptographic hashing module 424 then performs a first instance cryptographic hashing $SHA256_0$ of the first input message 418 using the standard initialisation vector IV 422. $SHA256_0$ produces a first message digest $H_0$ which is stored in electronic storage 426. The second input message 420 is provided to a second cryptographic hashing module 428. The second cryptographic hashing module 428 then performs a second instance cryptographic hashing $SHA256_1$ of the second input message 420 using the first message digest $H_0$ as the initialisation vector. $SHA256_1$ produces a second message digest $H_1$ 430. The second message digest $H_1$ is combined with a Padding+Length 432 to create a third input message 434 of suitable size for cryptographic hashing using SHA256. In some embodiments, the Padding+Length may again be provided by non-volatile memory or hardwired values since the values in question are always constant. The third input message 434 is provided to a third cryptographic hashing module 438. The third cryptographic hashing module 438 performs a third instance cryptographic hashing $SHA256_2$ of the third input message 434 using the standard initialisation vector IV 436. $SHA256_2$ produces a third, and final, message digest $H_2$ 440. If the third message digest $H_2$ meets the Target condition, then the Bitcoin Block Header used to create that message digest $H_2$ can be broadcast to the Bitcoin Network. On the other hand, if the third message digest $H_2$ does not meet the Target condition, then one or more different Bitcoin Block Headers will need to be considered. In this embodiment, the one or more different Bitcoin Block Headers are derived by incrementing the Version field 404 and/or by incrementing the Nonce field 414 so as to give plural different input messages (plural different first input messages 418, plural different second input messages 420, and/or plural different third input messages 434) to be hashed.

Figure 5:
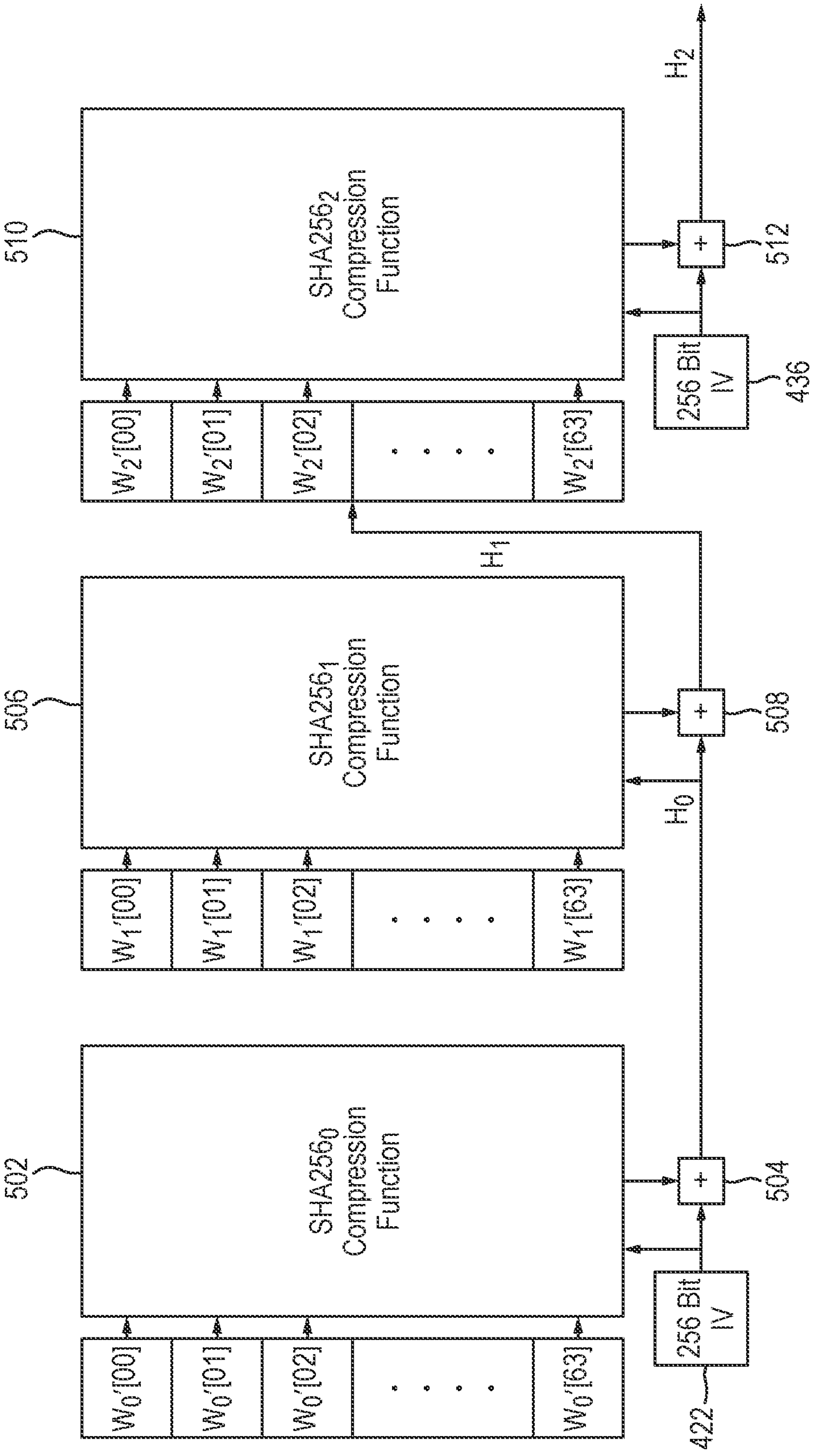
FIG. 5 illustrates details of message compression modules for use in the cryptographic hashing module of FIG. 4.

FIG. 5 shows a first message compressor 502 for performing the 64 rounds of compression in $SHA256_0$. The first message compressor 502 receives the set of constant-modified input values $W_0$'[t] from a message scheduler and the standard initialisation vector IV 422. Also shown is circuitry 504 for adding the outputs of the first message compressor 502 to the elements of the standard initialisation vector IV 422 to produce the first message digest $H_0$. Also shown is a second message compressor 506 for performing the 64 rounds of compression in $SHA256_1$. The second message compressor 506 receives the set of constant-modified input values $W_1$'[t] from a message scheduler and $H_0$ as an initialisation vector. Also shown is circuitry 508 for adding the outputs of the second message compressor 506 to the elements of $H_0$ to produce the second message digest $H_1$. Also shown is a third message compressor 510 for performing the 64 rounds of compression in $SHA256_2$. The third message compressor 510 receives the set of constant-modified input values $W_2$'[t] from a message scheduler (not shown), which are based on $H_1$, and the standard initialisation vector IV 436. Also shown is circuitry 512 for adding the outputs of the third message compressor 510 to the elements of the standard initialisation vector IV 436 to produce the third, and final, message digest $H_2$. In this embodiment, each of the message compressors comprises a resource sharing (rolled) hardware architecture. Using a resource sharing (rolled) hardware architecture for the message compressors again reduces the need for a large chip area; reducing power consumption.

Figure 6:
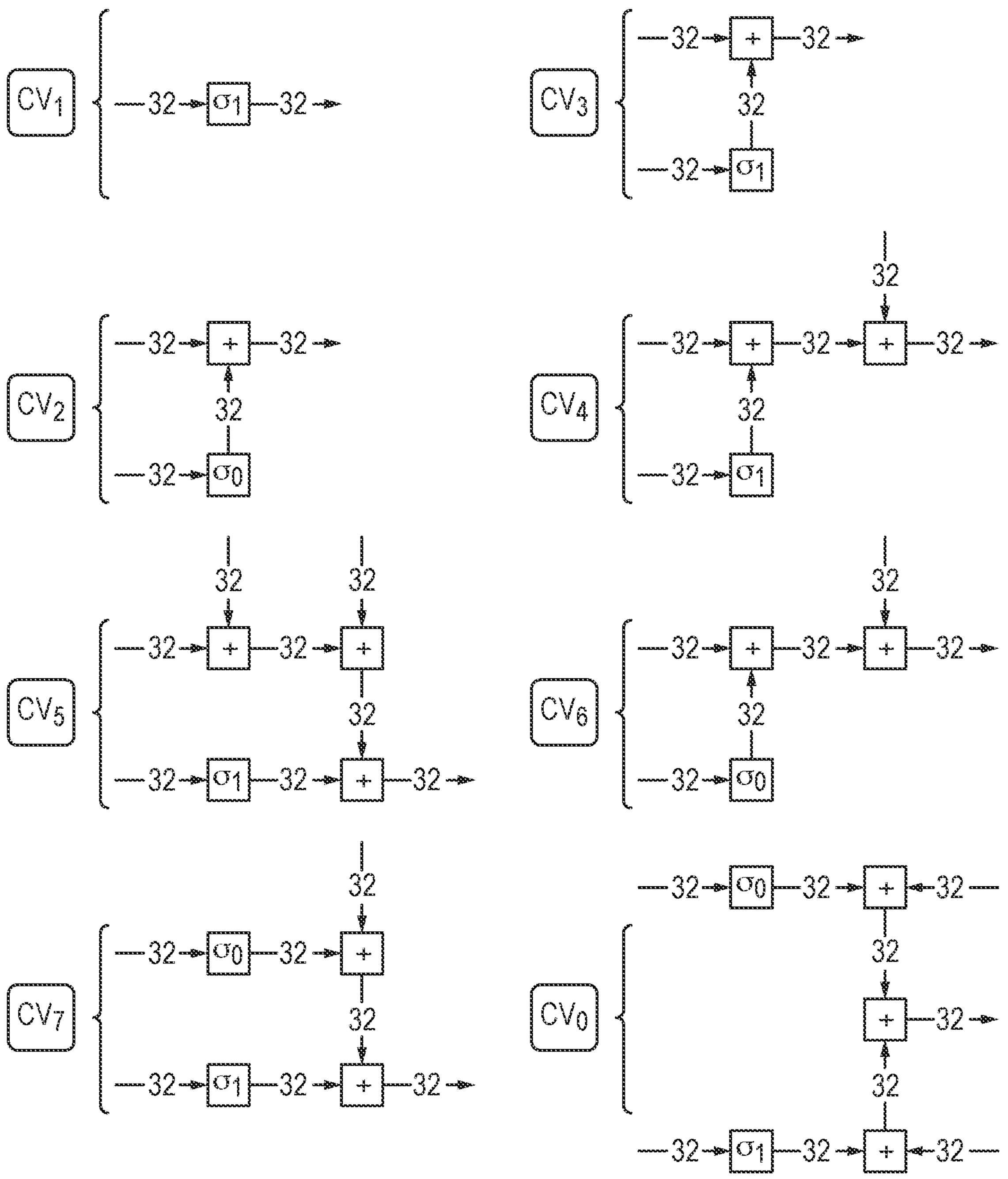
FIG. 6 shows the operations of computation variants used to derive fully-calculated input values according to an embodiment of the present invention.

FIG. 6 illustrates computation variants $CV_1$-$CV_7$ that can be used by a message scheduler when calculating fully-calculated input values using partially-calculated input values. Also shown for comparison is the standard computation variant $CV_0$ for fully calculating input values, i.e. for the full message scheduling calculation $\sigma_1$(W[t−2])+W[t−7]+$\sigma_0$(W

[t−15])+W[t−16]. As is apparent from FIG. 6, the computation variants $CV_1$-$CV_7$ can provide the following savings each time they are used in place of the standard computation variant $CV_0$:

| | Savings | | | |
|---|---|---|---|---|
| Variant | Add | ROTR | SHR | ⊕ |
| $CV_1$ | 3 | 2 | 1 | 2 |
| $CV_2$ | 2 | 2 | 1 | 2 |
| $CV_3$ | 2 | 2 | 1 | 2 |
| $CV_4$ | 1 | 2 | 1 | 2 |
| $CV_5$ | 0 | 2 | 1 | 2 |
| $CV_6$ | 1 | 2 | 1 | 2 |
| $CV_7$ | 1 | 0 | 0 | 0 |

$SHA256_0$ Implementation

Referring again to FIG. 4, the first input message 418, which is provided to the first cryptographic hashing module 424 to perform $SHA256_0$, comprises the 32-bit Version field 404; the 256-bit HashPrevBlock field 406; and the first 224 bits of the HashMerkleRoot field 408. As per "ASICBoost", mentioned above, the Version may be incremented to create multiple instances of $H_0$. When this happens, M[00] (i.e. corresponding to the 32-bit Version field 404) is incremented, but the other M[t] (i.e. corresponding to the HashPrevBlock field 406 and HashMerkleRoot field 408) do not vary. With this in mind, embodiments of the present invention can make use of the following observations for plural different first input messages 418:

W[03] to W[15] will remain unchanged.

$\sigma_{0/1}$(W[03]) to $\sigma_{0/1}$(W[15]) will also remain unchanged in view of observation 1 above.

Based on the current Target, W[01] and W[02] will remain unchanged as 0x00000000. Additions of these values can be avoided.

$\sigma_0$(W[01]) and $\sigma_0$(W[02]) will also remain unchanged as 0x00000000 in view of observation 3 above. Additions of these values can be avoided.

Various reusable values μ[t] can be calculated once for an initial value of W[00], such as 0x20000000, using the space-saving rolled hardware of FIG. 3.

For other values of W[00], the reusable values μ[t] can be directly fed into the computation variants $CV_1$-$CV_7$ shown in FIG. 6 to obtain the same result as the standard computation variant $CV_0$ shown in FIG. 6.

Constant-modified reusable values μ'[t]=μ[t]+K[t] can also be computed once for an initial value of W[00], such as 0x20000000, and then reused for other values of W[00] in cases where μ[t]=W[t].

For other values of W[00], the constant-modified reusable values μ'[t] can be directly fed into the message compression function of $SHA256_0$.

Figure 7:
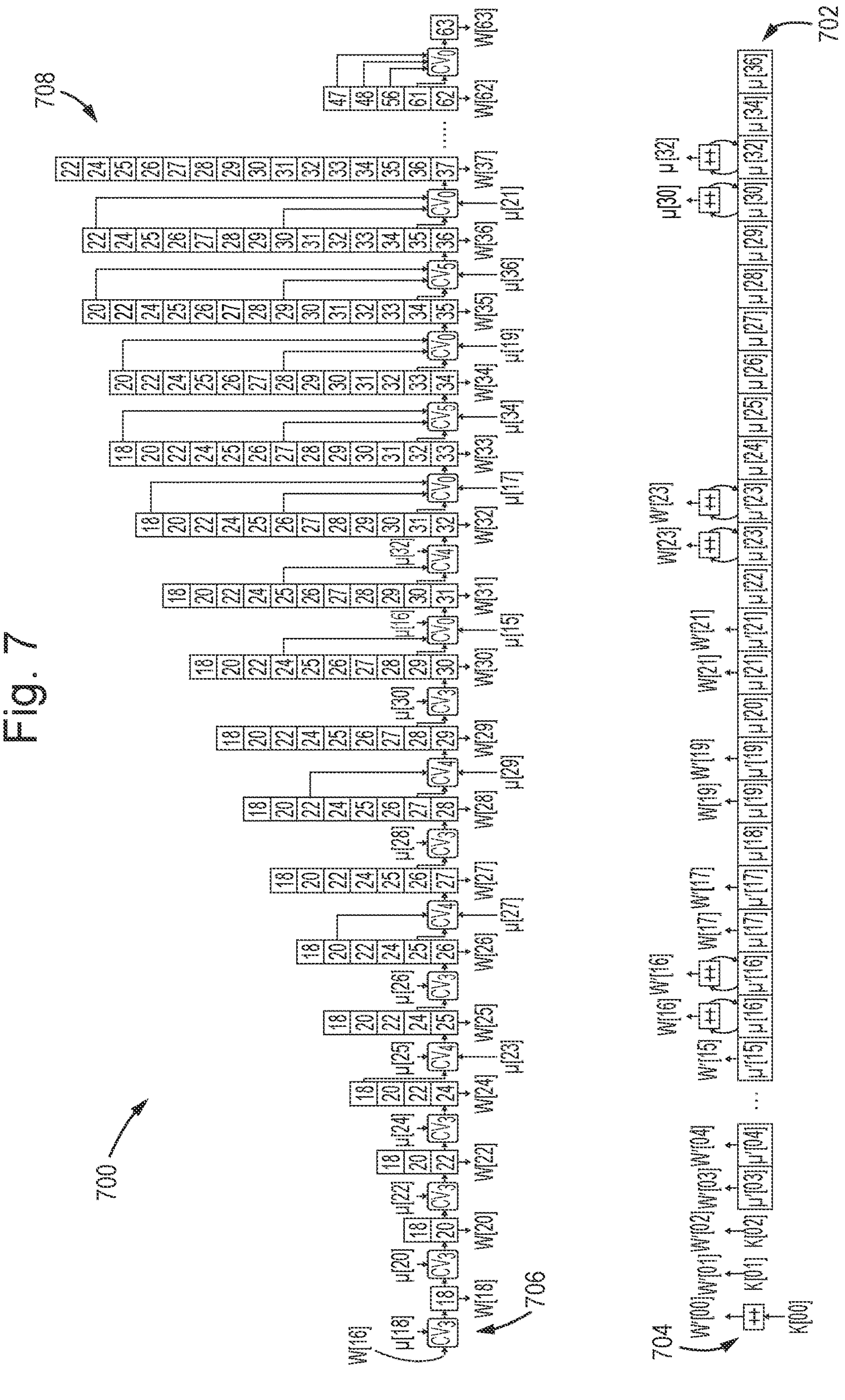
FIG. 7 illustrates a hardware implementation of a message scheduler for $SHA256_0$ according to an embodiment of the present invention.

The reusable values μ[t] and μ'[t] can be fed into the set of message schedule computation variants in a fully unrolled ASIC hardware implementation 700 to obtain a $SHA256_0$ fully unrolled message schedule as shown in FIG. 7.

Keeping the above observations in mind, the following reusable values μ[t] and μ'[t] can be stored for an initial input message and reused for subsequent input messages:

$SHA256_0$ Message Scheduler Calculations

| t | Initial W[t] | Stored Value μ[t] | Optimised W[t] for other inputs | Initial W'[t] | Stored Value μ'[t] | Optimised W'[t] = μ[t] + K[t] for other inputs | Comment |
|---|---|---|---|---|---|---|---|
| 0 | W[00] | — | W[00] | K[00] + W[00] | K[00] + W[00] | μ'[00]++ | Incremented |
| 1 | ~~W[01]~~ | ~~W[01]~~ | 0x00000000 | K[01] + ~~W[01]~~ | K[01] + ~~W[01]~~ | K[01] | W[01] Always 0x00000000 |
| 2 | ~~W[02]~~ | ~~W[02]~~ | 0x00000000 | K[02] + ~~W[02]~~ | K[02] + ~~W[02]~~ | K[02] | W[02] Always 0x00000000 |
| 3 | W[03] | — | W[03] | K[03] + W[03] | K[03] + W[03] | μ'[03] | Stored |
| 4 | W[04] | — | W[04] | K[04] + W[04] | K[04] + W[04] | μ'[04] | Stored |
| 5 | W[05] | — | W[05] | K[05] + W[05] | K[05] + W[05] | μ'[05] | Stored |
| 6 | W[06] | — | W[06] | K[06] + W[06] | K[06] + W[06] | μ'[06] | Stored |
| 7 | W[07] | — | W[07] | K[07] + W[07] | K[07] + W[07] | μ'[07] | Stored |
| 8 | W[08] | — | W[08] | K[08] + W[08] | K[08] + W[08] | μ'[08] | Stored |
| 9 | W[09] | — | W[09] | K[09] + W[09] | K[09] + W[09] | μ'[09] | Stored |
| 10 | W[10] | — | W[10] | K[10] + W[10] | K[10] + W[10] | μ'[10] | Stored |
| 11 | W[11] | — | W[11] | K[11] + W[11] | K[11] + W[11] | μ'[11] | Stored |
| 12 | W[12] | — | W[12] | K[12] + W[12] | K[12] + W[12] | μ'[12] | Stored |
| 13 | W[13] | — | W[13] | K[13] + W[13] | K[13] + W[13] | μ'[13] | Stored |
| 14 | W[14] | — | W[14] | K[14] + W[14] | K[14] + W[14] | μ'[14] | Stored |
| 15 | W[15] | — | W[15] | K[15] + W[15] | K[15] + W[15] | μ'[15] | Stored |

-continued

SHA256$_0$ Message Scheduler Calculations

| t | Initial W[t] | Stored Value μ[t] | Optimised W[t] for other inputs | Initial W'[t] | Stored Value μ'[t] | Optimised W'[t] = μ[t] + K[t] for other inputs | Comment |
|---|---|---|---|---|---|---|---|
| 16 | σ1(W[14]) + W[09] + ~~σ0(W[01])~~ + W[00] | σ1(W[14]) + W[09] + ~~σ0(W[01])~~ + W[00] | μ[16]++ | K[16] + σ1(W[14]) + W[09] + ~~σ0(W[01])~~ + W[00] | K[16] + σ1(W[14]) + W[09] + ~~σ0(W[01])~~ + W[00] | μ'[16]++ | Incremented |
| 17 | σ1(W[15]) + W[10] + ~~σ0(W[02])~~ + ~~W[01]~~ | σ1(W[15]) + W[10] + ~~σ0(W[02])~~ + ~~W[01]~~ | μ[17] | K[17] + σ1(W[15]) + W[10] + ~~σ0(W[02])~~ + ~~W[01]~~ | K[17] + σ1(W[15]) + W[10] + ~~σ0(W[02])~~ + ~~W[01]~~ | μ'[17] | Stored |
| 18 | σ1(W[16]) + W[11] + σ0(W[03]) + ~~W[02]~~ | W[11] + σ0(W[03]) + ~~W[02]~~ | μ[18] + σ1(W[16]) | K[18] + σ1(W[16]) + W[11] + σ0(W[03]) + ~~W[02]~~ | — | K[18] + μ[18] + σ1(W[16]) | Partially Stored |
| 19 | σ1(W[17]) + W[12] + σ0(W[04]) + W[03] | σ1(W[17]) + W[12] + σ0(W[04]) + W[03] | μ[19] | K[19] + σ1(W[17]) + W[12] + σ0(W[04]) + W[03] | K[19] + σ1(W[17]) + W[12] + σ0(W[04]) + W[03] | μ'[19] | Stored |
| 20 | σ1(W[18]) + W[13] + σ0(W[05]) + W[04] | W[13] + σ0(W[05]) + W[04] | μ[20] + σ1(W[18]) | K[20] + σ1(W[18]) + W[13] + σ0(W[05]) + W[04] | — | K[20] + μ[20] + σ1(W[18]) | Partially Stored |
| 21 | σ1(W[19]) + W[14] + σ0(W[06]) + W[05] | σ1(W[19]) + W[14] + σ0(W[06]) + W[05] | μ[21] | K[21] + σ1(W[19]) + W[14] + σ0(W[06]) + W[05] | K[21] + σ1(W[19]) + W[14] + σ0(W[06]) + W[05] | μ'[21] | Stored |
| 22 | σ1(W[20]) + W[15] + σ0(W[07]) + W[06] | W[15] + σ0(W[07]) + W[06] | μ[22] + σ1(W[20]) | K[22] + σ1(W[20]) + W[15] + σ0(W[07]) + W[06] | — | K[22] + μ[22] + σ1(W[20]) | Partially Stored |
| 23 | σ1(W[21]) + W[16] + σ0(W[08]) + W[07] | σ1(W[21]) + W[16] + σ0(W[08]) + W[07] | μ[23]++ | K[23] + σ1(W[21]) + W[16] + σ0(W[08]) + W[07] | K[23] + σ1(W[21]) + W[16] + σ0(W[08]) + W[07] | μ'[23]++ | Incremented |
| 24 | σ1(W[22]) + W[17] + σ0(W[09]) + W[08] | W[17] + σ0(W[09]) + W[08] | μ[24] + σ1(W[22]) | K[24] + σ1(W[22]) + W[17] + σ0(W[09]) + W[08] | — | K[24] + μ[24] + σ1(W[22]) | Partially Stored |
| 25 | σ1(W[23]) + W[18] + σ0(W[10]) + W[09] | σ0(W[10]) + W[09] | μ[25] + σ1(W[23]) + W[18] | K[25] + σ1(W[23]) + W[18] + σ0(W[10]) + W[09] | — | K[25] + μ[25] + σ1(W[23]) + W[18] | Partially Stored |
| 26 | σ1(W[24]) + W[19] + σ0(W[11]) + W[10] | W[19] + σ0(W[11]) + W[10] | μ[26] + σ1(W[24]) | K[26] + σ1(W[24]) + W[19] + σ0(W[11]) + W[10] | — | K[26] + μ[26] + σ1(W[24]) | Partially Stored |
| 27 | σ1(W[25]) + W[20] + σ0(W[12]) + W[11] | σ0(W[12]) + W[11] | μ[27] + σ1(W[25]) + W[20] | K[27] + σ1(W[25]) + W[20] + σ0(W[12]) + W[11] | — | K[27] + μ[27] + σ1(W[25]) + W[20] | Partially Stored |
| 28 | σ1(W[26]) + W[21] + σ0(W[13]) + W[12] | W[21] + σ0(W[13]) + W[12] | μ[28] + σ1(W[26]) | K[28] + σ1(W[26]) + W[21] + σ0(W[13]) + W[12] | — | K[28] + μ[28] + σ1(W[26]) | Partially Stored |
| 29 | σ1(W[27]) + W[22] + σ0(W[14]) + W[13] | σ0(W[14]) + W[13] | μ[29] + σ1(W[27]) + W[22] | K[29] + σ1(W[27]) + W[22] + σ0(W[14]) + W[13] | — | K[29] + μ[29] + σ1(W[27]) + W[22] | Partially Stored |

-continued

SHA256$_0$ Message Scheduler Calculations

| t | Initial W[t] | Stored Value μ[t] | Optimised W[t] for other inputs | Initial W'[t] | Stored Value μ'[t] | Optimised W'[t] = μ[t] + K[t] for other inputs | Comment |
|---|---|---|---|---|---|---|---|
| 30 | σ1(W[28]) + W[23] + σ0(W[15]) + W[14] | σ0(W[15]) + W[14] + W[23] | μ[30]++ + σ1(W[28]) | K[30] + σ1(W[28]) + W[23] + σ0(W[15]) + W[14] | — | K[30] + μ[30]++ + σ1(W[28]) | Partially Stored and Incremented |
| 31 | σ1(W[29]) + W[24] + σ0(W[16]) + W[15] | — | No Optimisation | K[31] + σ1(W[29]) + W[24] + σ0(W[16]) + W[15] | — | No Optimisation | No Optimisation |
| 32 | σ1(W[30]) + W[25] + σ0(W[17]) + W[16] | σ0(W[17]) + W[16] | μ[32]++ + σ1(W[30]) + W[25] | K[32] + σ1(W[30]) + W[25] + σ0(W[17]) + W[16] | — | K[32] + μ[32]++ + σ1(W[30]) + W[25] | Partially Stored and Incremented |
| 33 | σ1(W[31]) + W[26] + σ0(W[18]) + W[17] | — | No Optimisation | K[33] + σ1(W[31]) + W[26] + σ0(W[18]) + W[17] | — | No Optimisation | No Optimisation |
| 34 | σ1(W[32]) + W[27] + σ0(W[19]) + W[18] | σ0(W[19]) | μ[34]+ σ1(W[32]) + W[27] + W[18] | K[34] + σ1(W[32]) + W[27] + σ0(W[19]) + W[18] | — | K[34] + μ[34] + σ1(W[32]) + W[27] + W[18] | Partially Stored |
| 35 | σ1(W[33]) + W[28] + σ0(W[20]) + W[19] | — | No Optimisation | K[35] + σ1(W[33]) + W[28] + σ0(W[20]) + W[19] | — | No Optimisation | No Optimisation |
| 36 | σ1(W[34]) + W[29] + σ0(W[21]) + W[20] | σ0(W[21]) | μ[36] + σ1(W[34]) + W[29] + W[20] | K[36] + σ1(W[34]) + W[29] + σ0(W[21]) + W[20] | — | K[36] + μ[36] + σ1(W[34]) + W[29] + W[20] | Partially Stored |
| 37 | σ1(W[35]) + W[30] + σ0(W[22]) + W[21] | — | No Optimisation | K[37] + σ1(W[35]) + W[30] + σ0(W[22]) + W[21] | — | No Optimisation | No Optimisation |
| 38 | σ1(W[36]) + W[31] + σ0(W[23]) + W[22] | — | No Optimisation | K[38] + σ1(W[36]) + W[31] + σ0(W[23]) + W[22] | — | No Optimisation | No Optimisation |
| | | | | . . . | | | |
| 63 | σ1(W[36]) + W[31] + σ0(W[23]) + W[22] | — | No Optimisation | K[63] + σ1(W[36]) + W[31] + σ0(W[23]) + W[22] | — | No Optimisation | No Optimisation |

FIG. 7 shows a message scheduling hardware implementation 700 for SHA256$_0$ that makes use of the table above. As is shown, electronic storage 702 is provided to store and later provide the reusable values μ[t] and μ'[t], which are derived for an initial input message in accordance with the table above and then reused for one or more subsequent input messages. As is also shown, some of the reusable values μ'[t] can be used directly as W'[t] for each one of plural input messages having different Version values. Incrementing circuitry (one indicated as 704) is also provided for incrementing (++) the value of some of the incrementable reusable values μ[t] and μ'[t] for each subsequent input message in accordance with the table above. As is shown, in some cases the incremented reusable values μ[t] and μ'[t] can also be used as W[t] and W'[t] for that subsequent input message. Calculation modules (one indicated as 706) are also provided for performing the appropriate computation variants as shown in FIG. 6 for the subsequent input message in accordance with the table above. Further electronic storage 708 is also provided for storing and later providing the resultant fully calculated input values W[t] for the subsequent input message in accordance with the table above.

It is notable from the above that for t=18, 20, 22, 24-30, 32, 34 and 36, the reusable values μ[t] are partially-calculated versions of input values W[t] or W'[t] for the SHA256$_0$ cryptographic compression function which are calculated using invariable portions of the plural input messages to be hashed. Those reusable values μ[t] are then reused to calculate the fully-calculated input values W[t] or W'[t] for a subsequent input message using values based on one or more variable portions of the input messages to be hashed.

For example, for t=18, the reusable value μ[18]=W[11]+$\sigma_0$(W[03]) is a partially-calculated version of the fully-calculated input value W[18]=W[11]+$\sigma_0$(W[03])+W[02]+$\sigma_1$(W[16]) for the $SHA256_0$ cryptographic compression function which is calculated using only the invariable portions W[11], W[03] and W[02] of the input messages to be hashed. That reusable value μ[18] can then be reused to calculate (using $CV_3$) the fully-calculated input value W[18]=μ[18]+$\sigma_1$(W[16]) for a subsequent input message using a value $\sigma_1$(W[16]) which is based on the variable portion W[00] of the input messages to be hashed. Doing this for t=18 saves 2 add operations, 2 ROTR operations, 1 SHR operation and 2 ⊕ operations for each subsequent input message to be hashed.

As will be appreciated, the savings for all values of t will accumulate over time to give a significant reduction in the number of operations and thus processing time/resources required when performing $SHA256_0$. In particular, the following overall savings are possible for each subsequent input message:

| | Add | ROTR | SHR | ⊕ |
|---|---|---|---|---|
| Savings for W[t] in $SHA256_0$ Message Schedule | 33 | 46 | 23 | 46 |
| Total Operations for W[t] in standard SHA256 Message Schedule | 144 | 192 | 96 | 192 |
| $SHA256_0$ Message Schedule Reduction | 22.92% | 23.96% | 23.96% | 23.96% |
| Savings for W'[t] = W[t] + K[t] Calculation | 21 | — | — | — |
| Total Operations in standard W'[t] = W[t] + K[t] Calculation | 64 | — | — | — |
| W'[t] = W[t] + K[t] Calculation Reduction | 32.81% | — | — | — |

$SHA256_1$ Implementation

Referring again to FIG. 4, the second input message 420, which is provided to the second cryptographic hashing module 428 to perform $SHA256_1$, comprises the last 32 bits of the HashMerkleRoot field 408; the Timestamp field 410; the 32-bit Target field 412; the 32-bit Nonce field 414; and the 384-bit Padding+Length field 416. As mentioned above, the Nonce may be incremented to create multiple instances of $H_1$. When this happens, M[03] (i.e. corresponding to the 32-bit Nonce field 414) is incremented, but the other M[t] (i.e. corresponding to the HashMerkleRoot field 408, the Timestamp field 410, the Target field 412, and the Padding+Length field 416) do not vary. With this in mind, embodiments of the present invention can make use of the following observations for plural different second input messages 420:

W[00] to W[02] and W[04] to W[15] will remain unchanged.

$\sigma_{0/1}$(W[00]) to $\sigma_{0/1}$(W[02]) will also remain unchanged in view of observation 1 above.

W[05] to W[14] will remain unchanged as 0x00000000. Additions of these values can be avoided.

$\sigma_0$(W[05]) to $\sigma_0$(W[14]) will also remain unchanged as 0x00000000 in view of observation 3 above. Additions of these values can be avoided.

The constant-modified reusable values μ'[04]=W[04]+K[04]=0xB956C25B and μ'[15]=W[15]+K[15]=0xC19BF3F4 will forever remain unchanged and independent of any Bitcoin Block Header. They can thus be added to the list of $SHA256_1$ round-specific constants stored in non-volatile memory and directly fed from the non-volatile memory into the message compression function of $SHA256_1$.

Various reusable values μ[t] can be calculated once for an initial value of W[03], such as 0x00000000, using the space-saving rolled hardware of FIG. 3.

For other values of W[03], the reusable values μ[t] can be directly fed into the computation variants $CV_1$-$CV_7$ shown in FIG. 6 to obtain the same result as the standard computation variant $CV_0$ shown in FIG. 6.

Constant-modified reusable values μ'[t]=μ[t]+K[t] can also be computed once for an initial value of W[03], such as 0x00000000, and then reused for other values of W[03] in cases where μ[t]=W[t].

For other values of W[03], the constant-modified reusable values p'[t] can be directly fed into the message compression function of $SHA256_1$.

Figure 8:
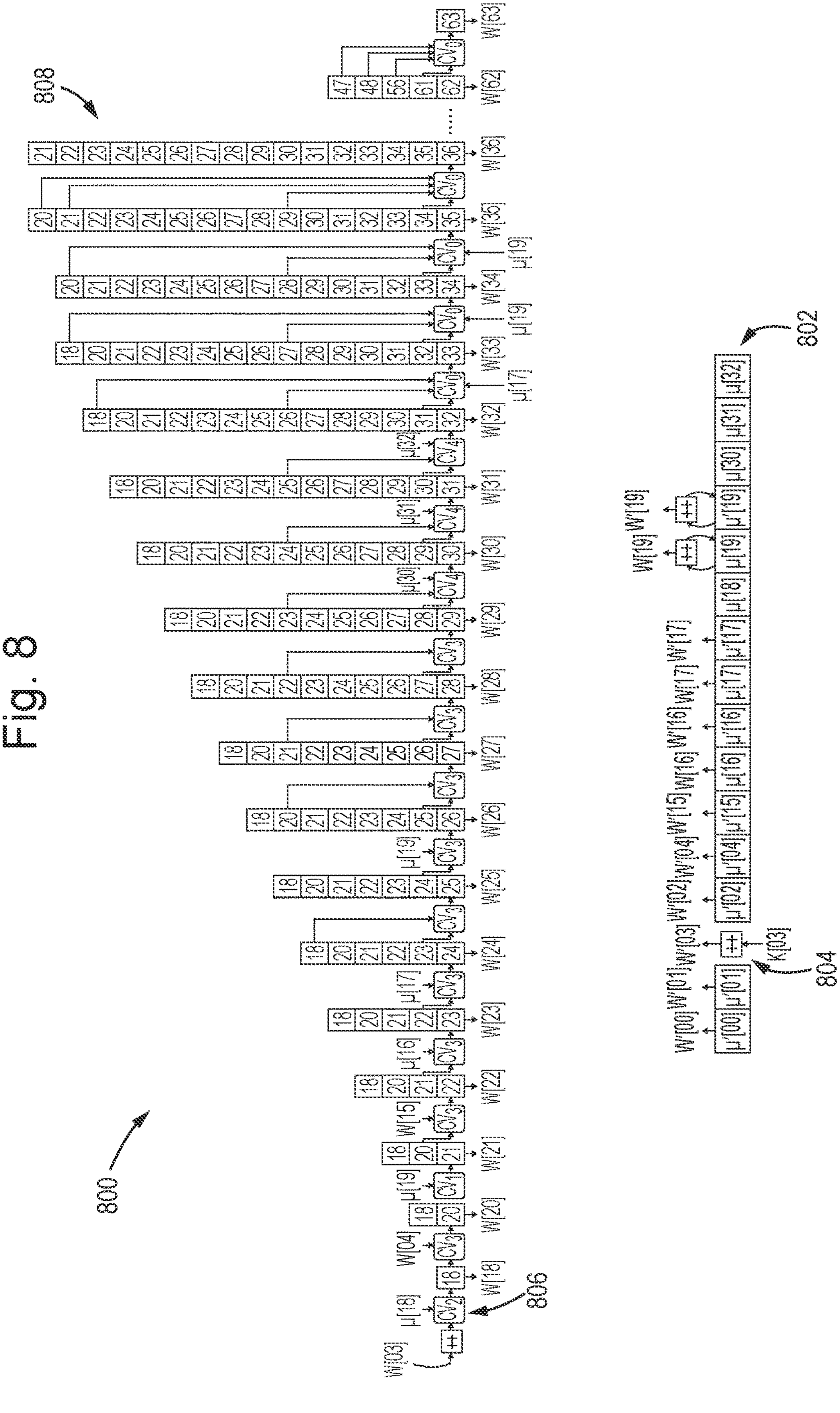
FIG. 8 illustrates a hardware implementation of a message scheduler for $SHA256_1$ according to an embodiment of the present invention.

The reusable values μ[t] and μ'[t] can be fed into the set of message schedule computation variants in a fully unrolled ASIC hardware implementation 800 to obtain a $SHA256_1$ fully unrolled message schedule as shown in FIG. 8.

Figure 9:
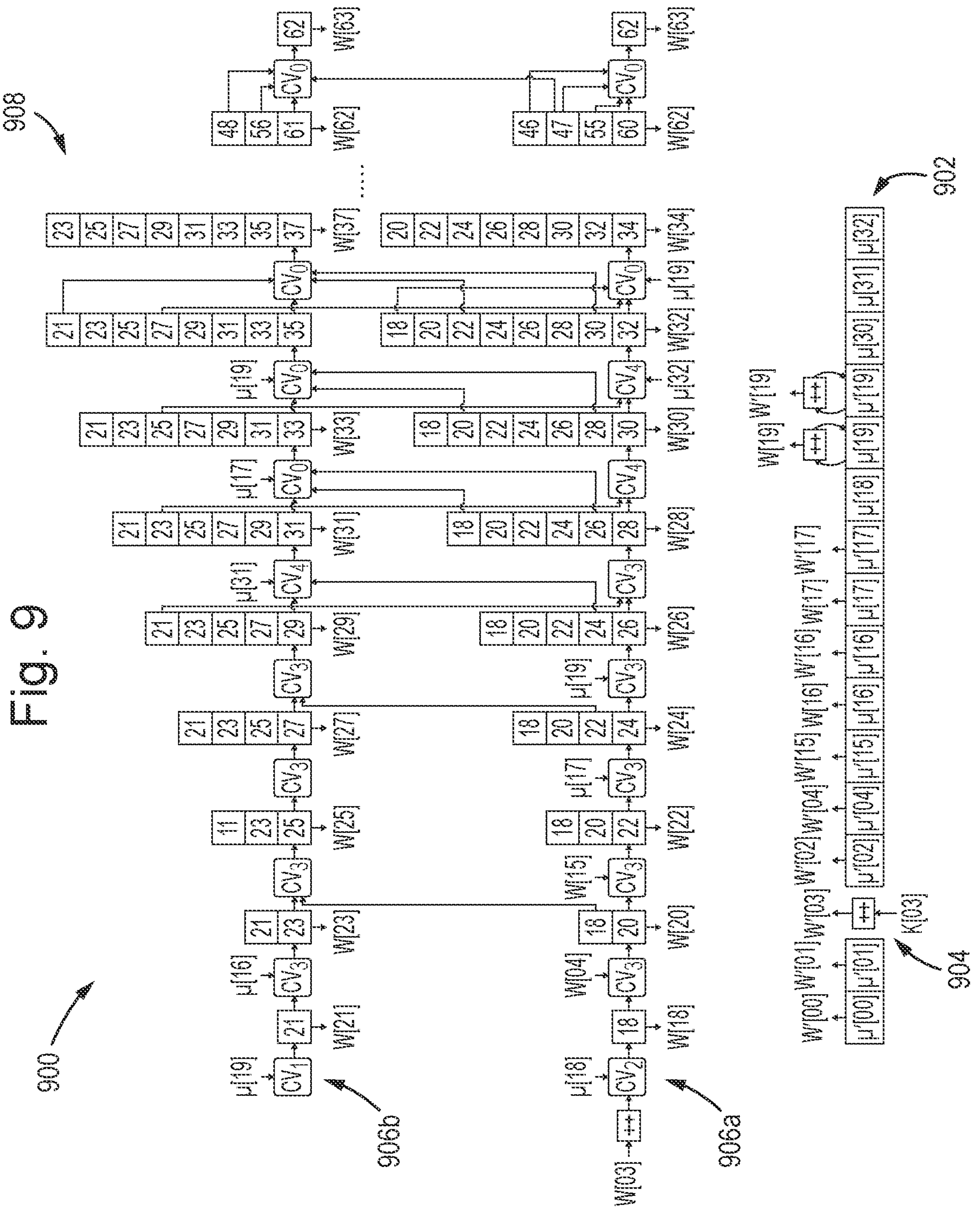
FIG. 9 illustrates a hardware implementation of a message scheduler for $SHA256_1$ according to another embodiment of the present invention.

The reusable values μ[t] and μ'[t] also allow the parallel computation of the message schedule. This is because the computation of W[t] no longer needs to be serialised since certain W[t] can be computed without the knowledge of the prior W[t]. An example parallel architecture 900 is shown in FIG. 9.

Keeping the above observations in mind, the following reusable values μ[t] and μ'[t] can be stored for an initial input message and reused for subsequent input messages:

$SHA256_1$ Message Scheduler Calculations

| t | Initial W[t] | Stored Value μ[t] | Optimised W[t] for other inputs | Initial W'[t] | Stored Value μ'[t] | Optimised W'[t] = μ[t] + K[t] for other inputs | Comment |
|---|---|---|---|---|---|---|---|
| 00 | W[00] | — | W[00] | K[00] + W[00] | K[00] + W[00] | μ'[00] | Stored |
| 01 | W[01] | — | W[01] | K[01] + W[01] | K[01] + W[01] | μ'[01] | Stored |
| 02 | W[02] | — | W[02] | K[02] + W[02] | K[02] + W[02] | μ'[02] | Stored |
| 03 | W[03] | — | W[03] | K[03] + W[03] | K[03] + W[03] | μ'[03]++ | Incremented |
| 04 | W[04] | W[04] | 0x80000000 | K[04] + W[04] | K[04] + W[04] | μ'[04] | W[04] Always 0x80000000 |
| 05 | ~~W[05]~~ | ~~W[05]~~ | 0x00000000 | K[05] + ~~W[05]~~ | K[05] + ~~W[05]~~ | K[05] | W[05] Always 0x00000000 |

-continued

SHA256$_1$ Message Scheduler Calculations

| t | Initial W[t] | Stored Value μ[t] | Optimised W[t] for other inputs | Initial W'[t] | Stored Value μ'[t] | Optimised W'[t] = μ[t] + K[t] for other inputs | Comment |
|---|---|---|---|---|---|---|---|
| 06 | ~~W[06]~~ | ~~W[06]~~ | 0x00000000 | K[06] + ~~W[06]~~ | K[06] + ~~W[06]~~ | K[06] | W[06] Always 0x00000000 |
| 07 | ~~W[07]~~ | ~~W[07]~~ | 0x00000000 | K[07] + ~~W[07]~~ | K[07] + ~~W[07]~~ | K[07] | W[07] Always 0x00000000 |
| 08 | ~~W[08]~~ | ~~W[08]~~ | 0x00000000 | K[08] + ~~W[08]~~ | K[08] + ~~W[08]~~ | K[08] | W[08] Always 0x00000000 |
| 09 | ~~W[09]~~ | ~~W[09]~~ | 0x00000000 | K[09] + ~~W[09]~~ | K[09] + ~~W[09]~~ | K[09] | W[09] Always 0x00000000 |
| 10 | ~~W[10]~~ | ~~W[10]~~ | 0x00000000 | K[10] + ~~W[10]~~ | K[10] + ~~W[10]~~ | K[10] | W[10] Always 0x00000000 |
| 11 | ~~W[11]~~ | ~~W[11]~~ | 0x00000000 | K[11] + ~~W[11]~~ | K[11] + ~~W[11]~~ | K[11] | W[11] Always 0x00000000 |
| 12 | ~~W[12]~~ | ~~W[12]~~ | 0x00000000 | K[12]+ ~~W[12]~~ | K[12] + ~~W[12]~~ | K[12] | W[12] Always 0x00000000 |
| 13 | ~~W[13]~~ | ~~W[13]~~ | 0x00000000 | K[13] + ~~W[13]~~ | K[13] + ~~W[13]~~ | K[13] | W[13] Always 0x00000000 |
| 14 | ~~W[14]~~ | ~~W[14]~~ | 0x00000000 | K[14] + ~~W[14]~~ | K[14] + ~~W[14]~~ | K[14] | W[14] Always 0x00000000 |
| 15 | W[15] | W[15] | 0x00000280 | K[15] + W[15] | K[15] + W[15] | μ'[15] | W[15] Always 0x00000280 |
| 16 | ~~σ1(W[14])~~ + ~~W[09]~~ + σ0(W[01]) + W[00] | ~~σ1(W[14])~~ + ~~W[09]~~ + σ0(W[01]) + W[00] | μ[16] | K[16] + σ0(W[01]) + W[00] | K[16] + σ0(W[01]) + W[00] | μ'[16] | Stored |
| 17 | σ1(W[15]) + ~~W[10]~~ + σ0(W[02]) + W[01] | σ1(W[15]) + ~~W[10]~~ + σ0(W[02]) + W[01] | μ[17] | K[17] + σ1(W[15]) + ~~W[10]~~ + σ0(W[02]) + W[01] | K[17] + σ1(W[15]) + ~~W[10]~~ + σ0(W[02]) + W[01] | μ'[17] | Stored |
| 18 | σ1(W[16]) + ~~W[11]~~ + σ0(W[03]) + W[02] | σ1(W[16]) + ~~W[11]~~ + W[02] | μ[18] + σ0(W[03]) | K[18] + σ1(W[16]) + ~~W[11]~~ + σ0(W[03]) + W[02] | — | K[18] + μ[18]+ σ0(W[03]) | Partially Stored |
| 19 | σ1(W[17]) + ~~W[12]~~ + σ0(W[04]) + W[03] | σ1(W[17]) + ~~W[12]~~ + σ0(W[04]) + W[03] | μ[19]++ | K[19] + σ1(W[17]) + ~~W[12]~~ + σ0(W[04]) + W[03] | K[19] + σ1(W[17]) + ~~W[12]~~ + σ0(W[04]) + W[03] | μ'[19]++ | Incremented |
| 20 | σ1(W[18]) + ~~W[13]~~ + ~~σ0(W[05])~~ + W[04] | ~~W[13]~~ + ~~σ0(W[05])~~ + W[04] | W[04] + σ1(W[18]) | K[20] + σ1(W[18]) + ~~W[13]~~ + ~~σ0(W[05])~~ + W[04] | — | K[20] + W[04] + σ1(W[18]) | W[05], W[13] Always 0x00000000 |
| 21 | σ1(W[19]) + ~~W[14]~~ + ~~σ0(W[06])~~ + ~~W[05]~~ | ~~W[14]~~ + ~~σ0(W[06])~~ + ~~W[05]~~ | σ1(W[19]) | K[21] + σ1(W[19]) + ~~W[14]~~ + ~~σ0(W[06])~~ + ~~W[05]~~ | — | K[21] + σ1(W[19]) | W[14], W[05], W[06] Always 0x00000000 |
| 22 | σ1(W[20]) + W[15] + ~~σ0(W[07])~~ + ~~W[06]~~ | W[15] + ~~σ0(W[07])~~ + ~~W[06]~~ | σ1(W[20]) + W[15] | σ1(W[20]) + W[15] + ~~σ0(W[07])~~ + ~~W[06]~~ | — | K[22] + W[15] + σ1(W[20]) | W[06], W[07] Always 0x00000000 |
| 23 | σ1(W[21]) + W[16] + ~~σ0(W[08])~~ + ~~W[07]~~ | W[16] + ~~σ0(W[08])~~ + ~~W[07]~~ | σ1(W[21]) + μ[16] | K[23] + σ1(W[21]) + W[16] + ~~σ0(W[08])~~ + ~~W[07]~~ | — | K[23] + σ1(W[21]) + μ[16] | Partially Stored |
| 24 | σ1(W[22]) + W[17] + ~~σ0(W[09])~~ + ~~W[08]~~ | W[17] + ~~σ0(W[09])~~ + ~~W[08]~~ | σ1(W[22]) + μ[17] | K[24] + σ1(W[22]) + W[17] + ~~σ0(W[09])~~ + ~~W[08]~~ | — | K[24] + σ1(W[22]) + μ[17] | Partially Stored |

-continued

SHA256$_1$ Message Scheduler Calculations

| t | Initial W[t] | Stored Value μ[t] | Optimised W[t] for other inputs | Initial W'[t] | Stored Value μ'[t] | Optimised W'[t] = μ[t] + K[t] for other inputs | Comment |
|---|---|---|---|---|---|---|---|
| 25 | σ1(W[23]) + W[18] + ~~σ0(W[10]) + W[09]~~ | ~~σ0(W[10]) + W[09]~~ | σ1(W[23]) + W[18] | K[25] + σ1(W[23]) + W[18] + ~~σ0(W[10]) + W[09]~~ | — | K[25] + σ1(W[23]) + W[18] | W[9], W[10]<br>Always 0x00000000 |
| 26 | σ1(W[24]) + W[19] + ~~σ0(W[11]) + W[10]~~ | ~~σ0(W[11]) + W[10]~~ | σ1(W[24]) + W[19] | K[26] + σ1(W[24]) + W[19] + ~~σ0(W[11]) + W[10]~~ | — | K[26] + σ1(W[24]) + W[19] | W[10], W[11]<br>Always 0x00000000 |
| 27 | σ1(W[25]) + W[20] + ~~σ0(W[12]) + W[11]~~ | ~~σ0(W[12]) + W[11]~~ | σ1(W[25]) + W[20] | K[27] + σ1(W[25]) + W[20] + ~~σ0(W[12]) + W[11]~~ | — | K[27] + σ1(W[25]) + W[20] | W[11], W[12]<br>Always 0x00000000 |
| 28 | σ1(W[26]) + W[21] + ~~σ0(W[13]) + W[12]~~ | ~~σ0(W[13]) + W[12]~~ | σ1(W[26]) + W[21] | K[28] + σ1(W[26]) + W[21] + ~~σ0(W[13]) + W[12]~~ | — | K[28] + σ1(W[26]) + W[21] | W[12], W[13]<br>Always 0x00000000 |
| 29 | σ1(W[27]) + W[22] + ~~σ0(W[14]) + W[13]~~ | ~~σ0(W[14]) + W[13]~~ | σ1(W[27]) + W[22] | K[29] + σ1(W[27]) + W[22] + ~~σ0(W[14]) + W[13]~~ | — | K[29] + σ1(W[27]) + W[22] | W[13], W[14]<br>Always 0x00000000 |
| 30 | σ1(W[28]) + W[23] + σ0(W[15]) + ~~W[14]~~ | σ0(W[15]) + ~~W[14]~~ | σ1(W[28]) + W[23] + μ[30] | K[30] + σ1(W[28]) + W[23] + σ0(W[15]) + ~~W[14]~~ | — | K[30] + σ1(W[28]) + W[23] + μ[30] | Partially Stored |
| 31 | σ1(W[29]) + W[24] + σ0(W[16]) + W[15] | σ0(W[16]) + W[15] | μ[31] + σ1(W[29]) + W[24] | K[31] + σ1(W[29]) + W[24] + σ0(W[16]) + W[15] | — | K[31] + μ[31] + σ1(W[29]) + W[24] | Partially Stored |
| 32 | σ1(W[30]) + W[25] + σ0(W[17]) + W[16] | σ0(W[17]) + W[16] | μ[32] + σ1(W[30]) + W[25] | K[32] + σ1(W[30]) + W[25] + σ0(W[17]) + W[16] | — | K[32] + μ[32] + σ1(W[30]) + W[25] | Partially Stored |
| 33 | σ1(W[31]) + W[26] + σ0(W[18]) + W[17] | — | No Optimisation | K[33] + σ1(W[31]) + W[26] + σ0(W[18]) + W[17] | — | No Optimisation | No Optimisation |
| 34 | σ1(W[32]) + W[27] + σ0(W[19]) + W[18] | — | No Optimisation | K[34] + σ1(W[32]) + W[27] + σ0(W[19]) + W[18] | — | No Optimisation | No Optimisation |
| | | | | . . . | | | |
| 63 | σ1(W[61]) + W[56] + σ0(W[48]) + W[47] | — | No Optimisation | K[63] + σ1(W[61]) + W[56] + σ0(W[48]) + W[47] | — | No Optimisation | No Optimisation |

FIG. 8 shows a message scheduling hardware implementation 800 for SHA256$_1$ that makes use of the above table. As is shown, electronic storage 802 is provided to store and later provide the reusable values μ[t] and μ'[t], which are derived for an initial input message in accordance with the table above and then reused for one or more subsequent input messages. As is also shown, some of the reusable values μ'[t] can be used directly as W'[t] for each one of plural input messages having different Nonce values. Incrementing circuitry (one indicated as 804) is also provided for incrementing (++) the value of some of the incrementable reusable values μ[t] and μ'[t] for each subsequent input message in accordance with the table above. As is shown, in some cases the incremented reusable values μ[t] and μ'[t] can then be used as W[t] and W'[t] for that subsequent input message. Calculation modules (one indicated as 806) are also provided for performing the appropriate computation variants as shown in FIG. 6 for the subsequent input message in accordance with the table above. Further electronic storage 808 is also provided for storing and later providing the resultant fully calculated input values W[t] for the subsequent input message in accordance with the table above.

FIG. 9 shows an alternative message scheduling hardware implementation 900 for $SHA256_1$ in which the fully calculated input values W[t] are calculated in parallel rather than in series. As is shown, electronic storage 902 is again provided to store and later provide the reusable values μ[t] and μ'[t], which are derived for an initial input message in accordance with the table above and then reused for one or more subsequent input messages. As is also shown, some of the reusable values μ'[t] can be used directly as W'[t] for each one of plural input messages having different Nonce values. Incrementing circuitry (one indicated as 904) is again also provided for incrementing (++) the value of some of the incrementable reusable values μ[t] and μ'[t] for each subsequent input message in accordance with the table above. As is shown, in some cases the incremented reusable values μ[t] and μ'[t] can then be used as W[t] and W'[t] for that subsequent input message.

In this embodiment, a first set of calculation modules (one module in the first set is indicated as 906*a*) and a second set of calculation modules (one module in the second set is indicated as 906*b*) are also provided for performing the appropriate computation variants as shown in FIG. 6 for the subsequent input message in accordance with the table above. As will be appreciated, the calculation modules of the first set can operate in parallel with the calculation modules of the second set since the values needed by the modules of one set will already have been calculated by the other set, and vice versa, and so there is no need to run those modules entirely in series. Further electronic storage 908 is also provided for storing and later providing the resultant fully calculated input values W[t] for the subsequent input message in accordance with the table above.

It is notable from the above that for t=18, 20 and 22-32 the reusable values μ[t] are partially-calculated versions of input values W[t] or W'[t] for the $SHA256_1$ cryptographic compression function which are calculated using invariable portions of the input messages to be hashed. Those reusable values μ[t] are then reused to calculate the fully-calculated input values W[t] or W'[t] for a subsequent input message using values based on one or more variable portions of the input messages to be hashed.

For example, for t=18, the reusable value $\mu[18]=\sigma_1(W[16])+W[02]$ is a partially-calculated version of the fully-calculated input value $W[18]=W[11]+\sigma_0(W[03])+W[02]+\sigma_1(W[16])$ for the $SHA256_1$ cryptographic compression function which is calculated using only the invariable portions W[16], W[11] and W[02] of the input messages to be hashed. That reusable value μ[18] can then be reused to calculate (using $CV_2$) the fully-calculated input value $W[18]=\mu[18]+\sigma_0(W[03])$ for a subsequent input message using a value $\sigma_0(W[03])$ which is based on the variable portion W[03] of the input messages to be hashed. Doing this for t=18 saves 2 add operations, 2 ROTR operations, 1 SHR operation and 2 ⊕ operations for each subsequent input message to be hashed.

As will be appreciated, the savings for all values of t will again accumulate over time to give a significant reduction in the number of operations and thus processing time/resources required when performing $SHA256_1$. In particular, the following overall savings are possible for each subsequent input message:

| | Add | ROTR | SHR | ⊕ |
|---|---|---|---|---|
| Savings for W[t] in $SHA256_1$ Message Schedule | 35 | 40 | 20 | 40 |
| Total Operations for W[t] in standard SHA256 Message Schedule | 144 | 192 | 96 | 192 |
| $SHA256_1$ Message Schedule Reduction | 24.31% | 20.83% | 20.83% | 20.83% |
| Savings for W'[t] = W[t] + K[t] Calculation | 19 | — | — | — |
| Total Operations in standard W'[t] = W[t] + K[t] Calculation | 64 | — | — | — |
| W'[t] = W[t] + K[t] Calculation Reduction | 29.68% | — | — | — |

$SHA256_2$ Implementation

Referring again to FIG. 4, the third input message 434, which is provided to a third cryptographic hashing module 438 to perform $SHA256_2$, comprises the 256-bit second message digest $H_1$ field 430 and the 256-bit Padding+Length field 432. M[00]-M[07] (i.e. corresponding to the second message digest $H_1$ field 430) will vary, but M[08]-M[15] (i.e. corresponding to the 384-bit Padding+Length field 432) do not vary. With this in mind, embodiments of the present invention can make use of the following observations for plural different third input messages 434:

W[08] to W[15] will remain unchanged as 0x00000000. Additions of these values can be avoided.

$\sigma_{0/1}(W[08])$ to $\sigma_{0/1}(W[15])$ will also remain unchanged as 0x00000000 in view of observation 1 above. Additions of these values can be avoided.

The reusable values μ[17]=0x00A00000, μ[23]=0x11002000, and μ[30]=0x00400022 will forever remain unchanged and independent of any Bitcoin Block Header. They can thus be added to the list of $SHA256_2$ round-specific constants stored in non-volatile memory and directly fed from the non-volatile memory into the message compression function of $SHA256_2$.

The constant-modified reusable values p'[08]=W[08]+K[08]=0x5807AA98 and μ'[15]=W[15]+K[15]=0xC19BF274 will forever remain unchanged and independent of any Bitcoin Block Header. They can thus be added to the list of $SHA256_2$ round-specific constants stored in non-volatile memory and directly fed from the non-volatile memory into the message compression function of $SHA256_2$.

Various reusable values μ[t] can be calculated once using the space-saving rolled hardware of FIG. 3.

For other input messages (i.e. other values of $H_1$), the reusable values μ[t] can be directly fed into the computation variants $CV_1$-$CV_7$ shown in FIG. 6 to obtain the same result as the standard computation variant $CV_0$ shown in FIG. 6.

Figure 10:
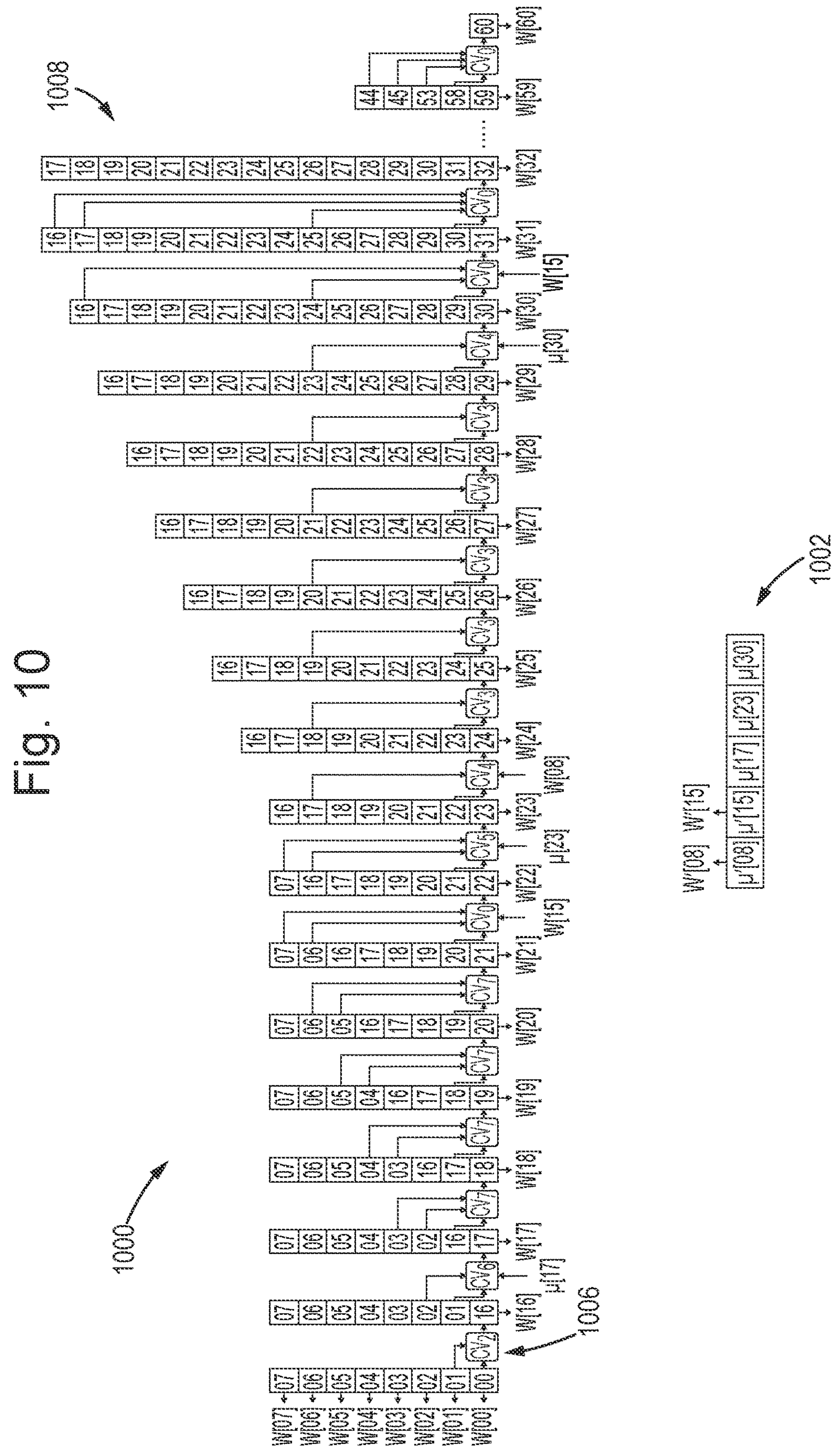
FIG. 10 illustrates a hardware implementation of a message scheduler for $SHA256_2$ according to an embodiment of the present invention.

The reusable values μ[t] and μ'[t] can be fed into the set of message schedule computation variants in a fully unrolled ASIC hardware implementation 1000 to obtain a $SHA256_2$ fully unrolled message schedule as shown in FIG. 10.

W[61] to W[63] need not be implemented in a fully unrolled ASIC implementation. This is because these computations do not fall in the critical path since one can assert a winning Nonce by observing the value of the working variable E at round 61 [t=60].

Keeping the above observations in mind, the following reusable values μ[t] and μ'[t] can be stored for an initial input message and reused for subsequent input messages:

SHA256$_2$ Message Scheduler Calculations

| t | Initial W[t] | Stored Value μ[t] | Optimised W[t] for other inputs | Initial W'[t] | Stored Value μ'[t] | Optimised W'[t] = μ[t] + K[t] for other inputs | Comment |
|---|---|---|---|---|---|---|---|
| 00 | W[00] | — | No Optimisation | K[00] + W[00] | — | No Optimisation | No Optimisation |
| 01 | W[01] | — | No Optimisation | K[01] + W[01] | — | No Optimisation | No Optimisation |
| 02 | W[02] | — | No Optimisation | K[02] + W[02] | — | No Optimisation | No Optimisation |
| | | | | . . . | | | |
| 07 | W[07] | — | No Optimisation | K[07] + W[07] | — | No Optimisation | No Optimisation |
| 08 | W[08] | W[08] | 0x80000000 | K[08] + W[08] | K[08] + W[08] | μ'[08] | W[08] Always 0x80000000 |
| 09 | ~~W[09]~~ | ~~W[09]~~ | 0x00000000 | K[09] + ~~W[09]~~ | K[09] + ~~W[09]~~ | K[09] | W[09] Always 0x00000000 |
| 10 | ~~W[10]~~ | ~~W[10]~~ | 0x00000000 | K[10] + ~~W[10]~~ | K[10] + ~~W[10]~~ | K[10] | W[10] Always 0x00000000 |
| 11 | ~~W[11]~~ | ~~W[11]~~ | 0x00000000 | K[11] + ~~W[11]~~ | K[11] + ~~W[11]~~ | K[11] | W[11] Always 0x00000000 |
| 12 | ~~W[12]~~ | ~~W[12]~~ | 0x00000000 | K[12] + ~~W[12]~~ | K[12] + ~~W[12]~~ | K[12] | W[12] Always 0x00000000 |
| 13 | ~~W[13]~~ | ~~W[13]~~ | 0x00000000 | K[13] + ~~W[13]~~ | K[13] + ~~W[13]~~ | K[13] | W[13] Always 0x00000000 |
| 14 | ~~W[14]~~ | ~~W[14]~~ | 0x00000000 | K[14] + ~~W[14]~~ | K[14] + ~~W[14]~~ | K[14] | W[14] Always 0x00000000 |
| 15 | W[15] | W[15] | 0x00000100 | K[15] + W[15] | K[15] + W[15] | μ'[15] | W[15] Always 0x00000100 |
| 16 | ~~σ1(W[14]~~ + ~~W[09]~~ + σ0(W[01]) + W[00] | ~~σ1(W[14]~~ + ~~W[09]~~ | σ0(W[01]) + W[00] | K[16] + ~~σ1(W[14]~~ + ~~W[09]~~ + σ0(W[01]) + W[00] | — | K[16] + σ0(W[01]) + W[00] | W[09], W[14] Always 0x00000000 |
| 17 | σ1(W[15]) + ~~W[10]~~ + σ0(W[02]) + W[01] | σ1(W[15]) + ~~W[10]~~ | μ[17] + σ0(W[02]) + W[01] | K[17] + σ1(W[15]) + ~~W[10]~~ + σ0(W[02]) + W[01] | — | K[17] + μ[17] + σ0(W[02]) + W[01] | W[10] Always 0x00000000 |
| 18 | σ1(W[16]) + ~~W[11]~~ + σ0(W[03]) + W[02] | ~~W[11]~~ | σ1(W[16]) + σ0(W[03]) + W[02] | K[18] + σ1(W[16]) + ~~W[11]~~ + σ0(W[03]) + W[02] | — | K[18] + σ1(W[16]) + σ0(W[03]) + W[02] | W[11] Always 0x00000000 |
| 19 | σ1(W[17]) + ~~W[12]~~ + σ0(W[04]) + W[03] | ~~W[12]~~ | σ1(W[17]) + σ0(W[04]) + W[03] | K[19] + σ1(W[17]) + ~~W[12]~~ + σ0(W[04]) + W[03] | — | K[19] + σ1(W[17]) + σ0(W[04]) + W[03] | W[12] Always 0x00000000 |
| 20 | σ1(W[18]) + ~~W[13]~~ + σ0(W[05]) + W[04] | ~~W[13]~~ | σ1(W[18]) + σ0(W[05]) + W[04] | K[20] + σ1(W[18]) + ~~W[13]~~ + σ0(W[05]) + W[04] | — | K[20] + σ1(W[18]) + σ0(W[05]) + W[04] | W[13] Always 0x00000000 |
| 21 | σ1(W[19]) + ~~W[14]~~ + σ0(W[06]) + W[05] | ~~W[14]~~ | σ1(W[19]) + σ0(W[06]) + W[05] | K[21] + σ1(W[19]) + ~~W[14]~~ + σ0(W[06]) + W[05] | — | K[21] + σ1(W[19]) + σ0(W[06]) + W[05] | W[14] Always 0x00000000 |
| 22 | σ1(W[20]) + W[15] + σ0(W[07]) + W[06] | — | No Optimisation | K[22] + σ1(W[20]) + W[15] + σ0(W[07]) + W[06] | — | No Optimisation | No Optimisation |
| 23 | σ1(W[21]) + W[16] + σ0(W[08]) + W[07] | σ0(W[08]) | μ[23] + σ1(W[21]) + W[16] + W[07] | K[23] + σ1(W[21]) + W[16] + σ0(W[08]) + W[07] | — | K[23] + μ[23] + σ1(W[21]) + W[16] + W[07] | Partially Stored |
| 24 | σ1(W[22]) + W[17] + ~~σ0(W[09])~~ + W[08] | ~~σ0(W[09])~~ + W[08] | W[08] + σ1(W[22]) + W[17] | K[24] + σ1(W[22]) + W[17] + ~~σ0(W[09])~~ + W[08] | — | K[24] + σ1(W[22]) + W[17] + W[08] | W[09] Always 0x00000000 |

-continued

SHA256$_2$ Message Scheduler Calculations

| t | Initial W[t] | Stored Value μ[t] | Optimised W[t] for other inputs | Initial W'[t] | Stored Value μ'[t] | Optimised W'[t] = μ[t] + K[t] for other inputs | Comment |
|---|---|---|---|---|---|---|---|
| 25 | σ1(W[23]) + W[18] + ~~σ0(W[10]) + W[09]~~ | ~~σ0(W[10]) + W[09]~~ | σ1(W[23]) + W[18] | K[25] + σ1(W[23]) + W[18] + ~~σ0(W[10]) + W[09]~~ | — | K[25] + σ1(W[23]) + W[18] | W[09], W[10] Always 0x00000000 |
| 26 | σ1(W[24]) + W[19] + ~~σ0(W[11]) + W[10]~~ | ~~σ0(W[11]) + W[10]~~ | σ1(W[24]) + W[19] | K[26] + σ1(W[24]) + W[19] + ~~σ0(W[11]) + W[10]~~ | — | K[26] + σ1(W[24]) + W[19] | W[10], W[11] Always 0x00000000 |
| 27 | σ1(W[25]) + W[20] + ~~σ0(W[12]) + W[11]~~ | ~~σ0(W[12]) + W[11]~~ | σ1(W[25]) + W[20] | K[27] + σ1(W[25]) + W[20] + ~~σ0(W[12]) + W[11]~~ | — | K[27] + σ1(W[25]) + W[20] | W[11], W[12] Always 0x00000000 |
| 28 | σ1(W[26]) + W[21] + ~~σ0(W[13]) + W[12]~~ | ~~σ0(W[13]) + W[12]~~ | σ1(W[26]) + W[21] | K[28] + σ1(W[26]) + W[21] + ~~σ0(W[13]) + W[12]~~ | — | K[28] + σ1(W[26]) + W[21] | W[12], W[13] Always 0x00000000 |
| 29 | σ1(W[27]) + W[22] + ~~σ0(W[14]) + W[13]~~ | ~~σ0(W[14]) + W[13]~~ | σ1(W[27]) + W[22] | K[29] + σ1(W[27]) + W[22] + ~~σ0(W[14]) + W[13]~~ | — | K[29] + σ1(W[27]) + W[22] | W[13], W[14] Always 0x00000000 |
| 30 | σ(W[28]) + W[23] + σ0(W[15]) + ~~W[14]~~ | σ0(W[15]) + ~~W[14]~~ | μ[30] + σ1(W[28]) + W[23] | K[30] + σ1(W[28]) + W[23] + σ0(W[15]) + ~~W[14]~~ | — | K[30] + μ[30] + σ1(W[28]) + W[23] | Partially Stored |
| 31 | σ1(W[29]) + W[24] + σ0(W[16]) + W[15] | — | No Optimisation | K[31] + σ1(W[29]) + W[24] + σ0(W[16]) + W[15] | — | No Optimisation | No Optimisation |
| | | | | . . . | | | |
| 60 | σ1(W[58]) + W[53] + σ0(W[45]) + W[44] | K[60] | No Optimisation | K[60] + σ1(W[58]) + W[53] + σ0(W[45]) + W[44] | — | No Optimisation | No Optimisation |
| 61 | σ1(W[59]) + W[54] + σ0(W[46]) + W[45] | K[61] | No calculations for almost all Nonces | K[61] + σ1(W[59]) + W[54] + σ0(W[46]) + W[45] | — | No calculations for almost all Nonces | No calculations for almost all Nonces |
| 62 | σ1(W[60]) + W[55] + σ0(W[47]) + W[46] | K[62] | No calculations for almost all Nonces | K[62] + σ1(W[60]) + W[55] + σ0(W[47]) + W[46] | — | No calculations for almost all Nonces | No calculations for almost all Nonces |
| 63 | σ1(W[61]) + W[56] + σ0(W[48]) + W[47] | K[63] | No calculations for almost all Nonces | K[63] + σ1(W[61]) + W[56] + σ0(W[48]) + W[47] | — | No calculations for almost all Nonces | No calculations for almost all Nonces |

FIG. 10 shows a message scheduling hardware implementation 1000 for SHA256$_2$ that makes use of the above table. As is shown, electronic storage 1002 is provided to store and later provide the reusable values μ[t] and μ'[t], which are derived for an initial input message in accordance with the table above and then reused for one or more subsequent input messages. As is also shown, some of the reusable values μ'[t] can be used directly as W'[t] for each one of plural input messages. Calculation modules (one indicated as 1006) are also provided for performing the appropriate computation variants as shown in FIG. 6 for the subsequent input message in accordance with the table above. Further electronic storage 1008 is also provided for storing and later providing the resultant fully calculated input values W[t] for the subsequent input message in accordance with the table above.

It is notable from the above that for t=17, 23 and 30 the reusable values μ[t] are partially-calculated versions of input values W[t] or W'[t] for the $SHA256_2$ cryptographic compression function which are calculated using invariable portions of the input messages to be hashed. Those reusable values μ[t] are then reused to calculate the fully-calculated input values W[t] or W'[t] for a subsequent input message using values based on one or more variable portions of the input messages to be hashed.

For example, for t=17, the reusable value $\mu[17]=\sigma_1(W[15])$ is a partially-calculated version of the fully-calculated input value $W[17]=W[10]+\sigma_0(W[02])+W[01]+\sigma_1(W[15])$ for the $SHA256_2$ cryptographic compression function which is calculated using only the invariable portion W[15] of the input messages to be hashed. That reusable value μ[17] can then be reused to calculate (using $CV_6$) the fully-calculated input value W[17]=μ[17]+σ0(W[02])+W[01] for a subsequent input message using values σ0(W[02]) and W[01] which are based on the variable portions W[02] and W[01] of the input messages to be hashed. Doing this for t=17 saves 1 add operation, 2 ROTR operations, 1 SHR operation and 2 ⊕ operations for each subsequent input message to be hashed.

As will be appreciated, the savings for all values of t will again accumulate over time to give a significant reduction in the number of operations and thus processing time/resources required when performing $SHA256_2$. In particular, the following overall savings are possible for each subsequent input message:

| | Add | ROTR | SHR | ⊕ |
|---|---|---|---|---|
| Savings for W[t] in $SHA256_2$ Message Schedule | 31 | 32 | 16 | 32 |
| Total Operations for W[t] in standard SHA256 Message Schedule | 144 | 192 | 96 | 192 |
| $SHA256_2$ Message Schedule Reduction | 21.53% | 16.67% | 16.67% | 16.67% |
| Savings for W'[t] = W[t] + K[t] Calculation | 8 | — | — | — |
| Total Operations in standard W'[t] = W[t] + K[t] Calculation | 64 | — | — | — |
| W'[t] = W[t] + K[t] Calculation Reduction | 12.50% | — | — | — |

It will accordingly be appreciated from the above that embodiments of the present invention can greatly increase speed and efficiency when performing cryptographic hashing in respect of plural different input messages which have invariable portions and variable portions.

The invention claimed is:

1. A method of performing cryptographic hashing in respect of plural different input messages to be hashed, the method being performed by a cryptographic hashing module comprising a message scheduler and a message compressor, the method comprising:

causing the message scheduler to:

calculate a set of one or more reusable partially-calculated input values for a cryptographic compression function using one or more values based on one or more invariable portions of an initial input message to be hashed, wherein corresponding ones of the invariable portions do not vary across the plural different input messages to be hashed, and wherein calculation of a reusable partially-calculated input value of the set of one or more reusable partially-calculated input values comprises performing some, but not all, operations in a message scheduling calculation that comprises performing:

$$\sigma_1(W[t-2]) + W[t-7] + \sigma_0(W[t-15]) + W[t-16]$$

where:

$$\sigma_1(x) = ROTR_{17}(x) \oplus ROTR_{19}(x) \oplus SHR_{10}(x)$$

$$\sigma_0(x) = ROTR_7(x) \oplus ROTR_{18}(x) \oplus SHR_3(x)$$

$ROTR_i$ is a bitwise rotate right for $i$ bits $SHR_i$ is a bitwise shift right for $i$ bits;

$\oplus$ is a bitwise exclusive OR;

store the set of one or more reusable partially-calculated input values; and for each of one or more subsequent input messages to be hashed:

calculate a set of fully-calculated input values for the cryptographic compression function, wherein calculating the set of fully-calculated input values comprises performing calculations reusing the stored set of one or more reusable partially-calculated input values to reduce the number of calculations and also using one or more values based on one or more variable portions of the subsequent input message to be hashed, wherein corresponding ones of the variable portions do vary across the plural different input messages to be hashed, and wherein calculation of a fully-calculated input value of the set of fully-calculated input values comprises performing the remaining operations in the message scheduling calculation; and provide the set of fully-calculated input values for use by the message compressor when performing the cryptographic compression function in respect of the subsequent input message.

2. The method as claimed in claim 1, wherein the cryptographic hashing is performed when mining for Bitcoin.

3. The method as claimed in claim 1, wherein the plural different input messages to be hashed each correspond to a different Bitcoin Block Header.

4. The method as claimed in claim 1, wherein the plural different input messages to be hashed each comprise a Version field, a HashPrevBlock field, and part of a HashMerkleRoot field.

5. The method as claimed in claim 4, wherein the one or more invariable portions correspond to at least one of: the HashPrevBlock field; and the part of the HashMerkleRoot field.

6. The method as claimed in claim 4, wherein the one or more variable portions correspond to the Version field.

7. The method as claimed in claim 4, wherein the Version field is incremented across the plural different input messages.

8. The method as claimed in claim 1, wherein the plural different input messages to be hashed each comprise part of a HashMerkleRoot field, a Timestamp field, a Target field, a Nonce field, and a Padding+Length field.

9. The method as claimed in claim 8, wherein the one or more invariable portions correspond to at least one of: the part of the HashMerkleRoot field; the Timestamp field; the Target field; and the Padding+Length field.

10. The method as claimed in claim 8, wherein the one or more variable portions correspond to the Nonce field.

11. The method as claimed in claim 8, wherein the Nonce field is incremented across the plural different input messages.

12. The method as claimed in claim 1, wherein the plural different input messages to be hashed each comprise a Message Digest field and a Padding+Length field.

13. The method as claimed in claim 12, wherein the one or more invariable portions correspond to the Padding+Length field.

14. The method as claimed in claim 12, wherein the one or more variable portions correspond to the Message Digest field.

15. The method as claimed in claim 1, wherein calculation of the partially-calculated input value of the set of one or more reusable partially-calculated input values comprises performing one or more of: an add operation; a bitwise rotate right (ROTR) operation; a bitwise shift right (SHR) operation; and a bitwise exclusive OR (⊕) operation.

16. The method as claimed in claim 1, wherein calculation of the fully-calculated input value of the set of fully-calculated input values comprises performing one or more of: an add operation; a bitwise rotate right (ROTR) operation; a bitwise shift right (SHR) operation; and a bitwise exclusive OR (⊕) operation.

17. The method as claimed in claim 1, wherein calculating the set of one or more fully-calculated input values for a subsequent input message comprises calculating a first set of fully-calculated input values for the subsequent input message and calculating a second set of fully-calculated input values for the subsequent input message, wherein calculation of the first set of fully-calculated input values is performed in parallel with calculation of the second set of fully-calculated input values.

18. An apparatus for performing cryptographic hashing in respect of plural different input messages to be hashed, the apparatus comprising:

a message scheduler having processing circuitry configured to:

calculate a set of one or more reusable partially-calculated input values for a cryptographic compression function using one or more values based on one or more invariable portions of an initial input message to be hashed, wherein corresponding ones of the invariable portions do not vary across the plural different input messages to be hashed, and wherein calculation of a reusable partially-calculated input value of the set of one or more reusable partially-calculated input values comprises performing some, but not all, operations in a message scheduling calculation that comprises performing:

$$\sigma 1(W[t-2]) + W[t-7] + \sigma 0(W[t-15]) + W[t-16]$$

where:

$$\sigma 1(x) = ROTR17(x) \oplus ROTR19(x) \oplus SHR10(x)$$

$$\sigma 0(x) = ROTR7(x) \oplus ROTR18(x) \oplus SHR3(x)$$

$ROTRi$ is a bitwise rotate right for $i$ bits $SHRi$ is a bitwise shift right for $i$ bits;

$\oplus$ is a bitwise exclusive OR;

store the set of one or more reusable partially-calculated input values; and for each of one or more subsequent input messages to be hashed:

calculate a set of fully-calculated input values for the cryptographic compression function, wherein calculating the set of fully-calculated input values comprises performing calculations reusing the stored set of one or more reusable partially-calculated input values to reduce the number of calculations and also using one or more values based on one or more variable portions of the subsequent input message to be hashed, wherein corresponding ones of the variable portions do vary across the plural different input messages to be hashed, and wherein calculation of a fully-calculated input value of the set of fully-calculated input values comprises performing the remaining operations in the message scheduling calculation; and provide the set of fully-calculated input values for use by a message compressor when performing the cryptographic compression function in respect of the subsequent input message.

* * * * *